United States Patent [19]

Ouchi et al.

[11] Patent Number: 5,827,968
[45] Date of Patent: Oct. 27, 1998

[54] HUB UNIT WITH ROTATION SPEED SENSOR

[75] Inventors: Hideo Ouchi; Kouichi Morita, both of Kanagawa-ken, Japan

[73] Assignee: NSK Ltd., Tokyo, Japan

[21] Appl. No.: 933,534

[22] Filed: Sep. 9, 1997

Related U.S. Application Data

[63] Continuation of Ser. No. 700,929, Aug. 23, 1996, abandoned, which is a continuation of Ser. No. 503,631, Jul. 18, 1995, Pat. No. 5,583,431.

[30] Foreign Application Priority Data

| Jul. 18, 1994 | [JP] | Japan | 6-165633 |
| Aug. 11, 1994 | [JP] | Japan | 6-189276 |
| May 31, 1995 | [JP] | Japan | 7-133598 |

[51] Int. Cl.⁶ ............................................. G01P 3/48
[52] U.S. Cl. ...................... 73/514.39; 73/118.1; 324/174
[58] Field of Search ................ 73/514.39, 118.1; 324/174, 173

[56] References Cited

U.S. PATENT DOCUMENTS

| 3,500,091 | 3/1970 | Jones . | |
| 3,716,788 | 2/1973 | Nishida . | |
| 3,916,234 | 10/1975 | Stigall . | |
| 3,927,339 | 12/1975 | Paul et al. . | |
| 4,907,445 | 3/1990 | Okumura . | |
| 5,140,261 | 8/1992 | Seo et al. . | |
| 5,148,104 | 9/1992 | Ishikawa | 324/173 |
| 5,200,697 | 4/1993 | Adler et al. | 324/174 |
| 5,281,911 | 1/1994 | Caron et al. | 324/174 |
| 5,296,805 | 3/1994 | Clark et al. . | |
| 5,332,964 | 7/1994 | Ouchi | 324/174 |
| 5,363,033 | 11/1994 | Suda et al. | 324/207 |
| 5,393,146 | 2/1995 | Ishikawa | 384/448 |
| 5,434,503 | 7/1995 | Rigaux et al. | 324/174 |
| 5,567,058 | 10/1996 | Morita et al. | 324/174 |
| 5,583,431 | 12/1996 | Ouchi et al. | 73/514.39 |

FOREIGN PATENT DOCUMENTS

| 0 323 159 | 7/1989 | European Pat. Off. . |
| 0 426 298 | 5/1991 | European Pat. Off. . |
| 0 557 931 | 9/1993 | European Pat. Off. . |
| 2667947 | 4/1992 | France . |
| 2669728 | 5/1992 | France . |
| 3-99676 | 10/1991 | Japan . |

Primary Examiner—Max H. Noori
Attorney, Agent, or Firm—Evenson, McKeown, Edwards & Lenahan, P.L.L.C.

[57] ABSTRACT

A hub unit with rotation speed sensor comprising;
a stationary outer ring member having an outer raceway formed thereon, a rotatable hub having an axially inner end with a male thread portion formed thereon,
a inner ring member having an inner raceway formed thereon, and fittingly fixed onto the hub, a nut screwed on the male thread portion of the hub to axially retain the inner ring, a plurality of rolling members located between the outer raceway and the inner raceway, a cover fittingly fixed to the outer ring member at its opening end portion, an annular sensor supported by the cover so as to be located radially between the nut and the cover, a rotatable tone wheel made of magnetic material and fittingly fixed onto the inner ring, the sensor comprising an annular permanent magnet, a magnetic stator and a coil, so that the sensor is opposed generally circumferentially to part of the tone wheel with a small clearance therebetween.

1 Claim, 16 Drawing Sheets

5,827,968

HUB UNIT WITH ROTATION SPEED SENSOR

This application is a continuation of application Ser. No. 08/700,929, filed Aug. 23, 1996, now abandoned, which is a continuation of application Ser. No. 08/503,631, filed Jul. 18, 1995, which is now U.S. Pat. No. 5,583,431.

BACKGROUND OF THE INVENTION

1. Field of the Invention

The present invention is related to a hub unit with a rotating speed sensor which is used to rotatable support an automobile wheel with a suspension apparatus, while it is used to detect the rotation speed (rpm) of the wheel.

2. Description of the Related Art

A hub unit with rotation speed (rpm) sensor that is used to rotatably support an automobile wheel with respect to a suspension apparatus, and that is used to control an anti-lock brake system (ABS) or traction-control system (TCS) by detecting the rotation speed (rpm) of the wheel, has been disclosed in U.S. Pat. No. 4,907,445 as shown in FIG. 1.

The hub unit with rpm sensor shown in FIG. 1 comprises a hub 3 that has a flange section 1 located on its axially outer end (left end in FIG. 1) to secure the automobile wheel (not shown) and a first inner raceway 2a located around the outside peripheral surface in the center of the hub 3, an inner ring member 4 that is fitted around the outside peripheral surface in the center of this hub 3 and has a second inner raceway 2b around its outside peripheral surface, a nut 6 that is screwed onto a male screw portion 16 formed on the outside peripheral surface of the axially inner end (the right end in FIG. 1) of the hub 3 so as to press against the axially inner end face of the inner ring member 4 and to secure this inner ring member 4 to a prescribed location on the outside peripheral surface of the hub 3, an outer ring member 9 that has outer raceways 8a, 8b in rows around its inside peripheral surface and a mount section 7 around its outside peripheral surface for securing it to the suspension apparatus (not shown in the figures), and a plurality of rolling bodies or members 10 that are located between the hub 3 and the outer ring member 9. Thus, the hub 3, to which the automobile wheel (not shown) is secured, is rotatable supported inside the outer ring member 9 that is supported by the suspension apparatus.

In FIG. 1, there is a cylindrical tone wheel 29 securely fitted around the axially inner half (right half In FIG. 1) of the inner ring member 4. An uneven section 12 is formed on the axially inner end face of the tone wheel 29 (this is the end surface facing inward in a widthwise direction when installed in the vehicle; the right end face in FIG. 1) and the magnetic characteristics of this end face change, alternating at equal intervals around the tone wheel 29 in the circumferential direction. Moreover, a cover 34 covers the opening on the axially inner end of the outer ring member 9. Provided in this cover 13 is a sensor 35 whose axially outer end face is opposed to the uneven section 12 of the tone wheel 29.

When using the hub unit with rpm detector constructed au described above in FIG. 1, the automobile wheel (nut shown) secured to the flange section 1 formed on the axially outer end of the hub 3 is supported so that it rotates freely with respect to the suspension apparatus (not shown) to which the outer ring member 9 is supported. Also, as the tone wheal 29 secured around the inner ring member 4 rotates as the automobile wheel rotates, the output of the sensor 35, which is faced to the uneven section 12 formed on the axially inner end of the tone wheel 29, changes. The frequency at which the output of the sensor 35 changes is proportional to the rotation speed (rpm) of the automobile wheel, and therefore if the output signal from the sensor 35 is input into a controller (not shown), the rotation speed (rpm) of the wheel can be used to adequately control an ABS or TCS.

The prior art hub unit with rpm detector as described above has problems that must be solved.

Specifically, it is difficult to make it compact in size, therefore the type of vehicle that it can be installed in is limited to comparatively large-sized automobiles. In other words, because the sensor 35 to detect the rotation speed (rpm) of the automobile wheel is axially faced to the uneven surface 12 formed on the axially inner end face of the tons wheel 29, large dimensions in the axial direction of the rpm detection section could not be avoided.

Especially in the case of a relatively inexpensive device, simple magnetic material (not permanent magnetic material) is used for the tone wheel 29, and a so-called passive type sensor having a coil wound around a magnetic core is used as the sensor 35 facing this tons wheel 29. In the case of this passive sensor 35, in order to maintain the output of the sensor 35, the dimensions of the sensor 35 in the axial direction become somewhat large. As a result, the axial dimension of the hub unit with rpm detector is increased in the axial direction.

Besides the hub unit with rpm detector described above, the structures disclosed in Japanese Patent First Publication KOKAI No. H1-175502 and in Japanese Utility Model First Publication KOKAI No. H3-99676 have also been known.

In the constructions described in No. H3-99676 and No. H1-175502 mentioned above, the magnetic characteristics of the inside or outside peripheral surface of the tone wheel changes in the circumferential direction, and the detection section of the sensor is faced to the inside or outside peripheral surface of the tone wheel. However, in the case of the construction described in these publications, the core material of the passive type sensor is placed in the axial direction, and so it is desirable to make it more compact.

Furthermore, in Japanese Utility Model First Publication KOKAI No. H4-36121, the tone wheel, which rotates together with the outer ring member, is constructed so that its inside peripheral surface is faced to the sensor. However, in this case, the construction to which the tone wheel is applied differs from the construction in the present invention, and the conditions of its use are limited.

In European Patent Publication No. 0426298A1, a structure is disclosed where the tone wheel secured to the end portion of the hub is rotatable with the automobile wheel and its outer peripheral surface is faced to the inner peripheral surface of the annular sensor which is supported by the cover fittingly fixed to the outer ring member.

In this structure, the inner ring member is fitted onto the hub, and the tone wheel and a stop ring to prevent the inner ring member from being removed from there are provided in series in the axial direction of the hub. Since the sensor is of an annular shape, the sensor output can be increased. On the other hand, the installation space for the tone wheel must be large, so that compacting is difficult.

In order to reduce the dimensions of the hub unit in the axial direction, so that it is possible to install the hub unit in compact-sized automobiles having limited installation space, and thus simplifying the design of the vehicle, the hub unit with rpm sensor as shown in FIGS. 2 and 3, is disclosed in the copending Japanese patent application under No. H5-48365, which is hereinafter referred to as the previous invention. A hub 3 is formed with a flange section 1 on the outside peripheral surface of the axially outer end (this is the end that faces outward when installed in the vehicle; the left end in FIG. 2) of the hub 3 for securing the automobile wheel (not shown). There is a first inner raceway 2a and stepped section 15 formed around the outside peripheral surface in the middle portion of the hub 3.

Furthermore, an inner ring member 4 having a second inner raceway 2b formed around its outside peripheral surface, is fitted, for supporting, around the outside peripheral surface of the hub 3, and its axially outer end (left end in FIG. 2) comes into contact with the stepped section 15.

Incidentally, in place of forming the first inner raceway 2a directly on the outside peripheral surface of the hub 3, it is possible to form it on another inner ring member (not shown in the figure) that is separate from the hub 3, and this another inner ring member and the inner ring member 4 can both be secured around the outside peripheral surface of the hub 3.

There is a male screw portion 16 formed around the axially inner end portion (the portion located on the inside in the width direction when installed in the vehicle; right side in FIG. 2) of the hub 3. A nut 6 screws on to this male screw portion 16, and by tightening it, the inner ring member 4 is secured in a prescribed place around the outside peripheral surface of the hub 3. A mount section 7 is formed around the outside peripheral surface in the middle portion of an outer ring member 9 that is located around the hub 3, and it is used to secure the outer ring member 9 to the suspension apparatus (not shown).

Moreover, there are outer raceways 8a, 8b formed around the inside peripheral surface of the outer ring member 9 and faced to the first and second inner raceways 2a, 2b, respectively.

Also, there are a plurality of rolling bodies or members 10 located between the first and second inner raceways 2a, 2b and the outer raceways 8a, 8b, and they allow the hub 3 to freely rotate inside the outer ring member 9.

The "inner raceway" and "outer raceway" are also referred to as "inner ring raceway" and "and outer ring raceway".

Furthermore, there is a seal ring 17 between the inside peripheral surface on the axially outer end of the outer ring member 9 and the outside peripheral surface of the hub 3, so that it closes off the opening on the axially outer end of the spaces where the rolling bodies or members 10 are located between the inside peripheral surface of the outer ring member 9 and the outside peripheral surface of the hub 3.

Also, on the axially inner end of the hub 3, there is a cylindrical end section 22 with constant diameter located further axially inward than the male screw section 16, and formed to stick out from the axially inner end of the nut 6, so that a tone wheel 29 is supported by this cylindrical end section 22. The outer diameter of the cylindrical end section 22 is smaller than the groove or bottom diameter of the male screw 16.

The tone wheel 29 is made of magnetic sheet metal such as steel sheet that is formed by pressing, drawing, or another plastic working. This tone wheel 29 comprises an inner cylindrical section 19 with a smaller diameter, an outer cylindrical section 20 with a larger diameter that is concentric with the inner cylindrical section 19, and an annular section 21 that connects the two cylindrical sections 19 and 20. The tone wheel 29 is generally circular and has a cross-section that is crank-shaped.

There are a plurality of through-holes 33 that penetrate the outer cylindrical section 20, end by evenly spacing these through-holes 33 in the circumferential direction, the magnetic characteristics of the outside peripheral surface of the outer cylindrical section 20 are changed, alternatively at equal intervals in the circumferential direction.

The inner cylindrical section 19 of this tone wheel 29 is fitted around and secured to the cylindrical end section 22 formed on the axially inner end of the hub 3. With the tone wheel 29 Secured to the hub 3 in this manner, the outer cylindrical section. 20 is located around the nut 6.

Also, by closing off the opening on the axially inner end of the outer ring member 9 with a cover 34, it is possible to prevent dust or water from getting inside the outer ring member 9 through the opening. This cover 34 is made of sheet metal such as stainless steel and is formed by a processing method, such as drawing.

The axially outer end (left end in FIGS. 1 and 2) of this cover 34 has an opening. Provided on the outside peripheral surface of the axially outer end near the opening of the cover 34 is a protruding support section 25 that is flange shaped. The outer diameter of the axially outer end of the cover 34 in a free state is the same or a little larger than the inner diameter of the opening in the axially inner end face of the outer ring member 9. As a result, the axially outer end of the cover 34 near the opening is fitted into the opening on the axially inner end of the outer ring member 9, so that the protruding support section 25 comes into contact with the axially inner end face of the outer ring member 9.

Moreover, a passive-type sensor 35 is fastened and secured at a prescribed location inside this cover 34. The output signal of this sensor 35 is fetched from the lead wires (not shown in the figure) connected to the connector 26 located on the outside surface as of the cover 34. The detection section 27 of the sensor 35 is faced inward in the radial direction of the cover 34. With the cover 34 securely fitted into the axially inner end of the outer ring member 9, this detection section 27 is faced to the outside peripheral surface of the outer cylindrical section 20, and is separated by a small gap or clearance 28 of 0.6 to 1.0 mm.

Furthermore, the core material of the sensor 35 is arranged so that it runs in the circumferential direction of the tone wheel 29 (front to back in FIGS. 2 and 3). At least one end of this core material is bent inward in the radial direction to form the detection section 27, end it is very close to and faced to the outside peripheral surface of the tone wheel 29.

The hub unit with rpm sensor of this previous invention, constructed as described above, supports the automobile wheel so that it rotates freely with respect to the suspension apparatus, and its function in detecting the rotation speed (rpm) of the automobile wheel attached to the flange section 1 of the hub 3 is substantially the same as the prior art hub units with rpm sensor previously mentioned.

In the hub unit with rpm sensor of this previous invention, the sensor 35 of the passive type having a larger axial length is located on the radially outside of the tone wheel 29, Ad elongated in the circumferential direction, so that the dimensions of the hub unit with rpm sensor are reduced in both the axial and radial directions, making it possible to be installed a limited space in compact-sized automobiles etc.

The hub unit with rpm sensor constructed as described in the previous invention reduces its size in the axial direction, making it possible to install in compact automobiles etc. with limited installation space, and simplifying the vehicle design, when compared to the prior art constructions. But, it is still desired that the following points be improved.

In other words, It is desired that the output of the sensor 35 is raised (the change in output voltage is made larger) in order that the rotation speed (rpm) of the automobile wheel fastened to the hub 3 can be detected correctly. On the other hand, in order to amplify the output of the passive sensor 35 due to the change in voltage that accompanies the change in density of the magnetic flux that passes through the yoke or stator, the size of the sensor 35 must be increased, or the density of the magnetic flux of the permanent magnet (magnetic force) installed in the sensor must be increased.

The space that the sensor 35 can be installed in is limited, therefore the amount that the size of the senor 35 can be increased is also limited. In addition, the amount that the density of the magnetic flux of the permanent magnet can be increased is also limited, and even if a permanent magnet with a high magnetic flux density is installed in the sensor 35, whose yoke or pole piece has only a small cross-section, the magnetic flux becomes easily saturated in the yoke or pole piece. If the magnetic flux becomes saturated, the output of the sensor 35 is reduced.

In the structure as disclosed in European Patent publication No. 0426298A1, since the sensor is of an annular shape, the saturation in magnetic flux leading to the output reduction hardly occurs. On the other hard, since the axial dimension is inclined to be larger, there are problems in practical use of the hub unit with rpm sensor in the compact care in which the installation space is limited.

SUMMARY OF THE INVENTION

The present invention is to provide a hub unit with rpm sensor taking into consideration the problems as mentioned above.

With the hub unit with rpm detector in this invention, the sensor can be installed in a limited space, and the output of the sensor can be made sufficiently large, thus making it possible to accurately detect the rotation speed (rpm) of the members such as the automobile wheel that rotate with the hub. The hub unit with rpm detector in this invention has the permanent magnet, pole pieces and coil formed so that they are annular or ring-shaped so as to surround the entire tone wheel. Accordingly, the amount of magnetic flux that flows inside the pole piece can be made large in the entire pole piece. Also, the change in voltage of the coil that corresponds with the change in density of the magnetic flux that passes through the pole piece, can be made sufficiently large.

DESCRIPTION OF THE PREFERRED EMBODIMENTS

Now, the present invention is explained referring to FIG. 4 to FIG. 24.

Figure 4:
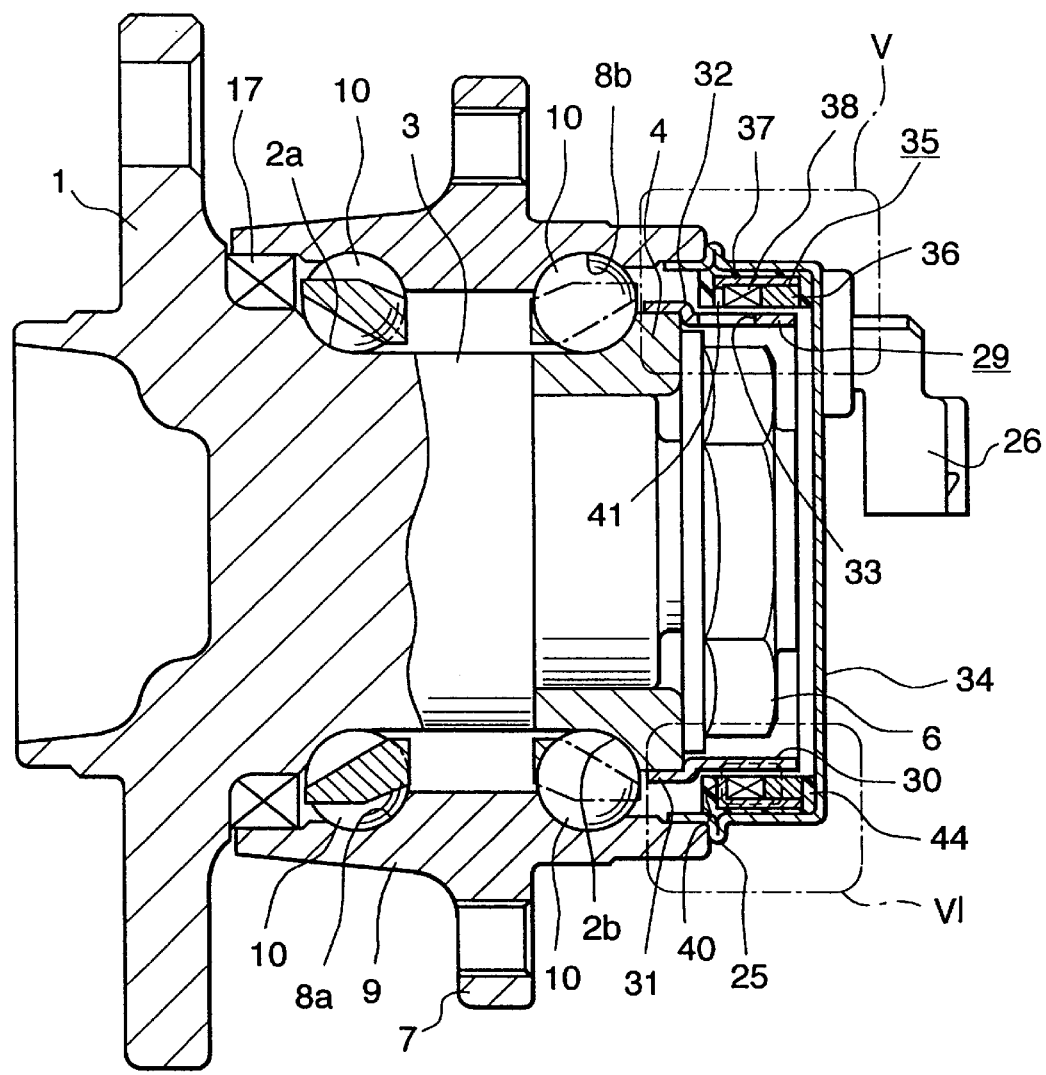
FIG. 4 is a cross sectional view of a first embodiment of the hub unit with rpm sensor in the present invention.
Figure 5:
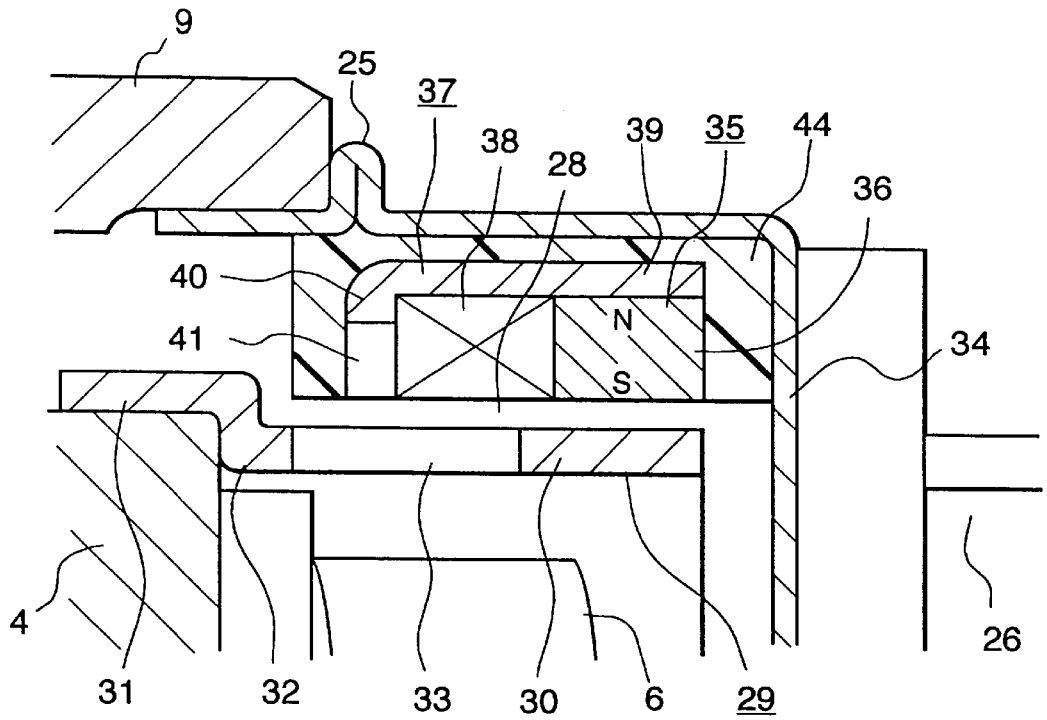
FIG. 5 is an enlarged view of the portion V in FIG. 4
Figure 6:
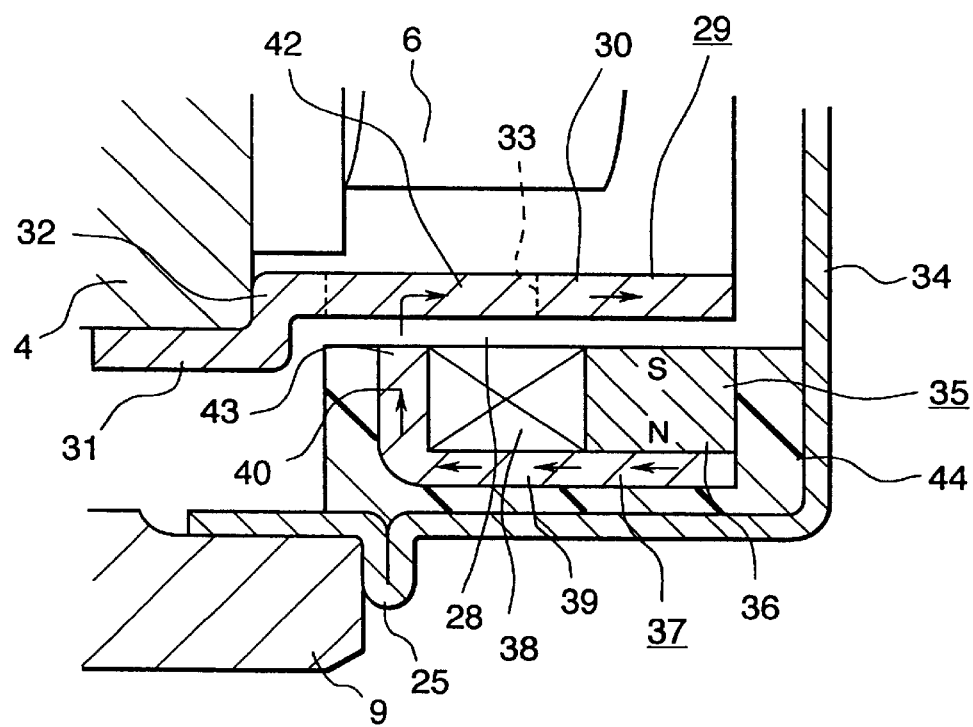
FIG. 6 is an enlarged view of the portion VI in FIG. 4

This embodiment in FIG. 4 to FIG. 6 is characterized by the detection section in the sensor 35 that detects the rotation speed (rpm) of a hub 3 that corresponds to the rotation speed (rpm) of the automobile wheel. The other construction and function of the hub unit is substantially the same as the hub unit of the previous invention described above. Therefore, a description on them is omitted with similar members indicated by similar reference numerals in the drawings.

The tone wheel 29 is made of magnetic metal such as steel plate and is formed generally cylindrically, This tone wheel 29 comprises a smaller diameter section 30 and a larger diameter section 31 which are concentric with and are connected to the smaller diameter section 30 by a stepped or annular section 32. The smaller and larger diameter section 30 and 31 are also referred to as the cylindrical section previously mentioned.

The larger diameter section 31 of this tone wheel 29 is fitted around the outside peripheral surface on the axially inner end of the inner ring member 4, and the stepped or annular section 32 comes in contact with the edge portion of the inner ring member 4 to support and secure the tone wheel 29 to the inner ring member 4.

The smaller diameter section 30 is supported so that it is concentric with the inner ring member 4. Also, this smaller diameter section 30 is formed with multiple cutouts such as through-holes or notches 33 that make up a first cut-out section on the rotating side, and these holes 33 are evenly spaced around in the circumferential direction. All of the through-holes 33 have the substantially same shape, for example a long rectangle running in the axial direction (right and left in FIGS. 4 and 6).

The opening on the axially inner and of the outer ring member 9 is covered by a cover 34 that is made of sheet metal such as stainless steel, or an aluminum alloy, and is made by a process such a drawing. This shape of this cover 34 is different from the shape of the cover 34 used in the construction of the previous invention described in FIGS. 2 and 3, in that the cover 34 of this embodiment has the substantially uniform shape generally in the circumference (symmetric around its center axis).

This cover 34 is not used to cause the magnetic flux to flow from the permanent magnet 36 of the sensor 35. The material of this cover 34 is different from the previous invention of FIGS. 2 and 3 in that it is made of non-magnetic material, and most favorably, synthetic resin, aluminum alloy, or copper. If it is made of stainless steel plate, a non-magnetic type should be used to prevent the leakage of magnetic flux. Other than this, it is substantially the sea as the cover 34 used in the previous invention of FIGS. 2 and 3. Also, there is a generally annular passive sensor 35 that is fastened inside the cover 34 and placed between the inner peripheral surface of the cover 34 and the outer peripheral surface of the nut 6.

This sensor 35 comprises a permanent magnet 36, a stator 37 made of magnetic material such as steel plate, and a coil 38, and the sensor is made generally annular by embedding the permanent magnet 36, stator 37 and coil 38 in synthetic resin 44.

The permanent magnet 36 is made generally ring shaped and so that it is magnetized in the radial direction. In other words, as shown in the example in the drawings, the inside peripheral surface of the permanent magnet 36 is the South pole and the outside peripheral surface is the North pole. The magnetic orientation of poles could be the opposite way.

Also, the inside peripheral surface (S pole) of the permanent magnet 36 is faced to the outside peripheral surface of the portion axially adjacent the through-holes 33 on the end of the smaller diameter section 19 of the tone wheel 29, and they are separated by a small gap or clearance 28.

The permanent magnet 36 can be made of a rare-earth magnet that has high magnetic flux density per unit area. In the construction of this embodiment, the output of the sensor 35 is sufficiently large even if the magnetic density per unit area is not that high. Also, in order to cut costs, it is possible to use an inexpensive permanent magnet such as a plastic magnet that has ferrite mixed in synthetic resin, or just a typical ferrite magnet.

Moreover, the stator 37 is made generally ring-shaped, so that its cross-section is L-shaped. In other words, this stator 37 has a cylindrical retaining section 39 and a bent section 40 that is bent inward in the radial direction at one end (left end in FIGS. 4 to 6) of the retaining section 39. Also, the inside peripheral surface on the other end side of the retaining section 39 (right end in FIGS. 4 to 6) and the outside peripheral surface of the permanent magnet 36 are very close or come in contact with each other. The radially inside edge of the bent section 40 is faced to the first cutout section formed with the multiple through-holes 33 on the tone wheel 29.

The bent section 40 is formed with a second cut-out section on the stationary side having multiple notches or through-holes 41 in the circumference direction, and these notches 41 have the substantially same pitch as the through-holes 33. The bent section 40 may have the form of comb teeth.

Furthermore, the coil 38 is ring shaped, and is attached to the inside peripheral surface of a part of the stator 37 between the permanent magnet 36 and the bent section 40. The electromotive force generated in this coil 38 is retrieved through the connector 26 that sticks out from the surface of the cover 34. Also, through-holes (not shown in the figures) are formed on a part of the stator 37, so that the lead wires that connect the coil 38 and the connector 26 pass through the through-holes.

In order to generate an electromotive force in the coil 38, this coil 38 could be attached to the outside peripheral surface of the stator 37, however, space is used more efficiently if the coil 38 is placed on the inside peripheral surface of the stator 37 between the permanent magnet 36 and the bent section 40, as shown in the drawing of this embodiment.

When the hub unit with rpm sensor of this embodiment, constructed as described above, is used, the density of the magnetic flux in the stator 37 which is faced to the tone wheel 29, changes as the tone wheel 29 rotates with the hub 3, and the voltage generated in the coil 38 changes at a frequency that is proportional to the rotation speed (rpm) of the hub 3. The principle that the voltage generated in the coil 38 changes due to the change in density of magnetic flux flowing in the stator 37 is the same as that for the rpm sensor that has been widely used previously, therefore an explanation of it will be omitted, however the reason that the density of the magnetic flux flowing in the stator 37 is changed due to the rotation of the tone wheel 29 will be explained below.

Since the pitch of the through-holes 33 formed in the tone wheel 29 is the same to that of the notches 41 formed in the stator 37, the through-holes 33 and the notches 41 may be simultaneously faced to each other all the way around as the tone wheel 29 rotates. Also, when these through-holes 33 and notches 41 are faced to each other, the magnetic column 42 located between two adjacent through-holes 33 and the magnetic tongue portion 43 located between two adjacent notches 41 are faced to each other with a small gap or clearance 28 between them. When the magnetic column portions 42 and tongue portions 43 are faced to each other generally along the periphery, a highly dense magnetic flux flows between the tone wheel 29 and stator 37.

If the through-holes 33 or notches 41 are shifted or displaced half out of phase with reference to each other, the density of the magnetic flux flowing between the tone wheel 29 and stator 37 becomes low. In other words, at the same time that the through-holes 33 formed in the tone wheel 29 are faced to the magnetic tongue portions 43, the notches 41 formed in the stator 37 are faced to the magnetic column portions 42.

When the column portions 42 are faced to the notches 41, and the tongue portions 43 are faced to the through-holes 33, a relatively large gap exists between the tone wheel 29 and stator 37 all the way around. Also, in this condition, the density of the magnetic flux flowing between the tone wheel 29 and the pole piece 37 is low.

As a result, the voltage generated in the coil 38 changes in proportion to the rotation speed (rpm) of the hub 3. In order to have a sufficient amount of change in the density of the magnetic flux, it is best if the width of the through-holes 33 is wider than the width of the magnetic tongue portions 43, and the width of the notches 41 is wider than the width of the column portions 42. In order to do this, the width of the through-holes 33 and notches 41 are made wider(e.g. about 1.5 times) than the widths of the magnetic column portions 42 and tongue portions 43.

When constructing and using the sensor 35 of the hub unit with rpm sensor of this embodiment as described above, the output voltage generated in the coil 38 changes at a frequency that is proportional to the rotation speed (rpm) of the hub 3. Since the annular space existing in the opening end of the outer ring member 9 around the nut 6 is utilized, this makes it possible for the sensor 35 to be installed in a limited space, and the output of the senior 35 is made sufficiently large, making it possible to more accurately detect the rotation speed (rpm) of the automobile wheel that rotates with the hub 3.

In other words, the permanent magnet 36, stator 37, and coil 38 of the hub unit with rpm sensor of this embodiment are arranged in an annular shape generally around the tone wheel 29. Also, since the magnetic flux coming from the permanent magnet 36 flows all the way around the stator 37, the amount of magnetic flux flowing generally through the stator 37 is made sufficiently large. Moreover, the change in voltage of the coil 38, which corresponds to the change in density of the magnetic flux passing through the stator 37, can be made sufficiently large.

Figure 7:
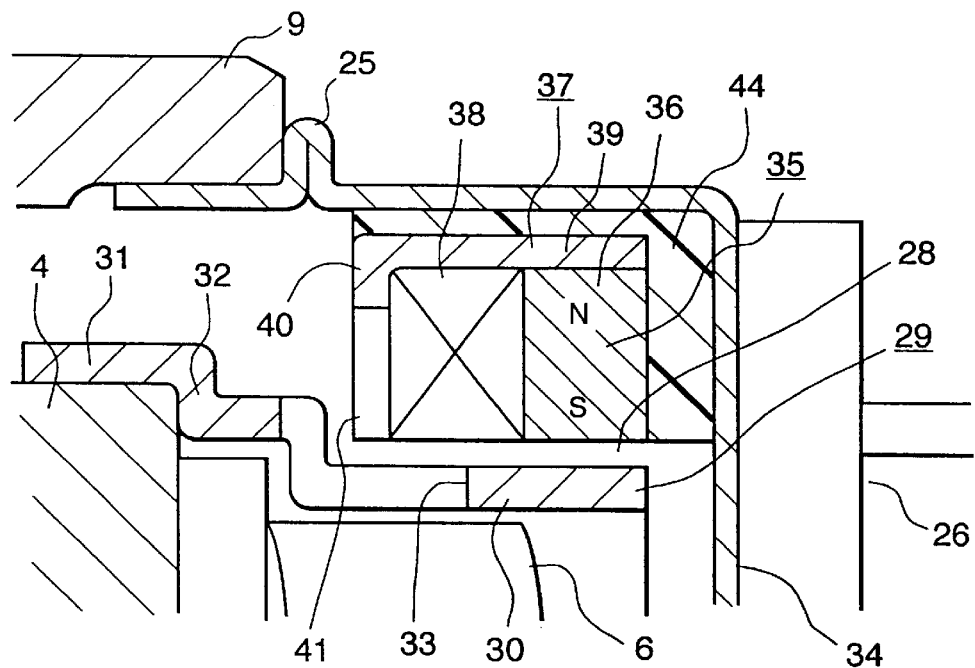
FIG. 7 is an enlarged view similar to FIG. 5 to show a second embodiment in the present invention.
Figure 8:
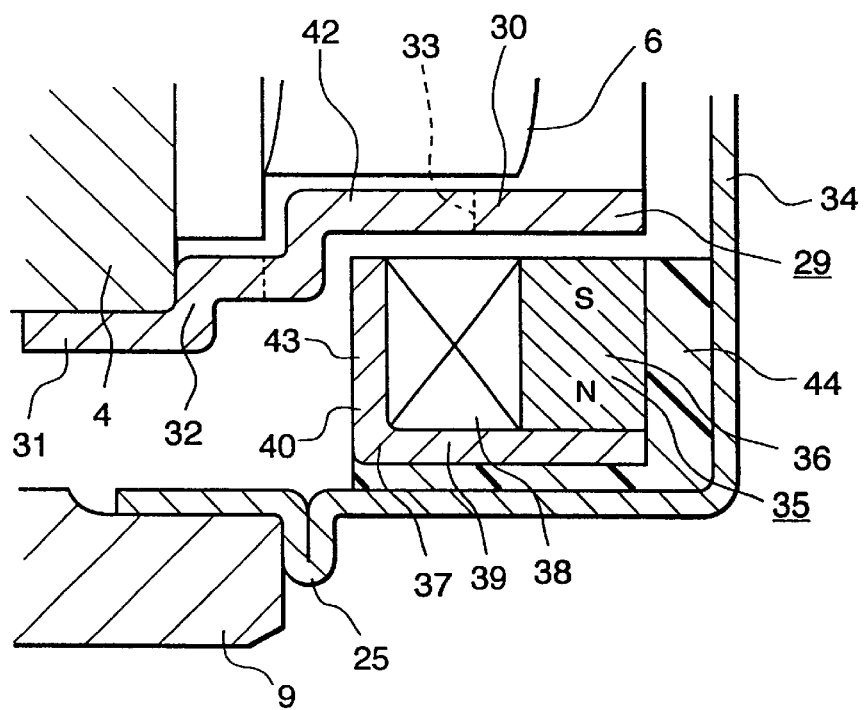
FIG. 8 is an enlarged view similar to FIG. 6 to show the second embodiment in the present invention.
Figure 9:
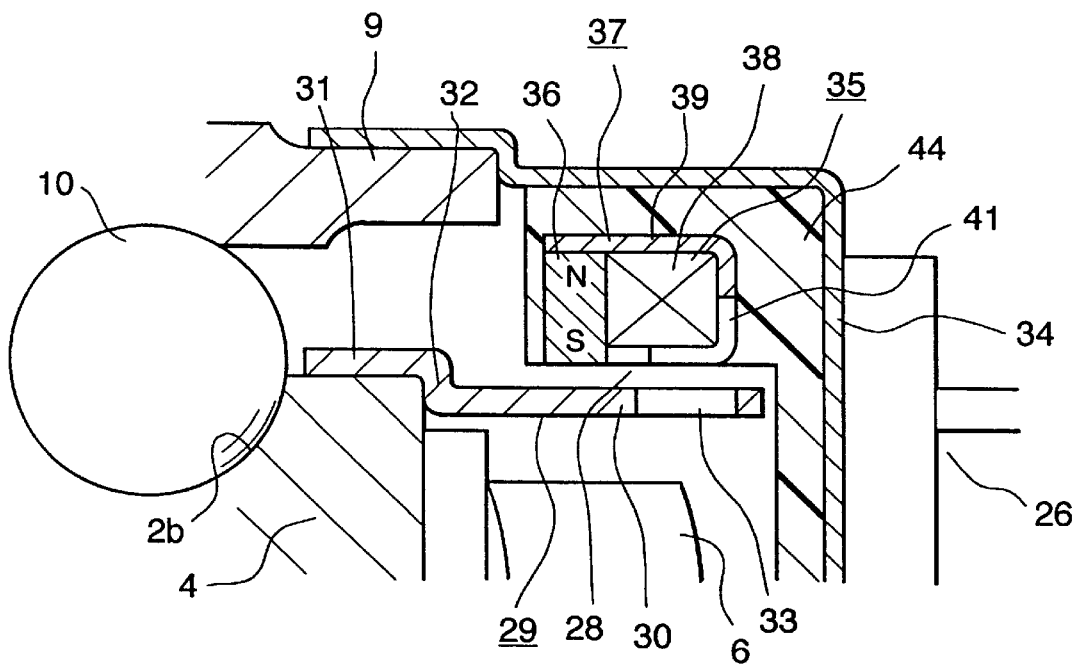
FIG. 9 is an enlarged view similar to FIG. 5 to show a third embodiment in the present invention.

Next, FIG. 7 and 8 show a second embodiment of the present invention. In this embodiment of the invention, the stepped section 32 of the tone wheel 29 has two steps, and the smaller diameter section 30, which corresponds to the cylindrical section previously described, is made smaller than in the first embodiment in FIG. 4 to 6. Also, the thickness in the radial direction (up and down dimension in FIGS. 7 and 8) of the permanent magnet 36 of the sensor 35, the bent section 40 of the stator 37, and the coil 38, is made larger by the amount that the diameter of the smaller diameter section 30 is made smaller. In addition, the depth of the notches 41 formed in the bent section 40 (up and down dimension in FIG. 7) is made larger. By changing these dimensions in this way, it is possible to make the change in voltage generated in the coil 38, larger than in the first embodiment in FIGS. 4 to 6. Other than this, the second embodiment is the substantially same as the first embodiment on FIGS. 4 to 6.

Figure 10:
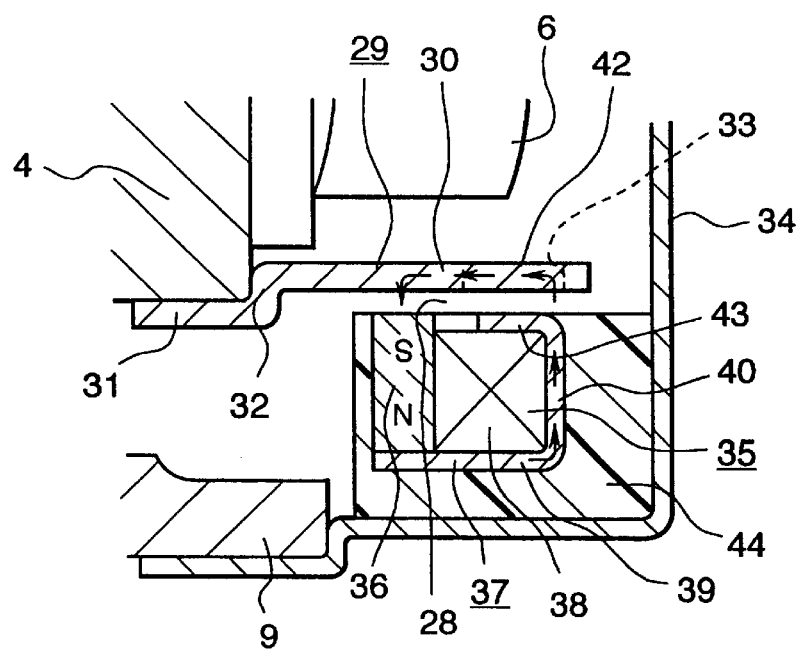
FIG. 10 is an enlarged view similar to FIG. 6 to show the third embodiment in the present invention.
Figure 19:
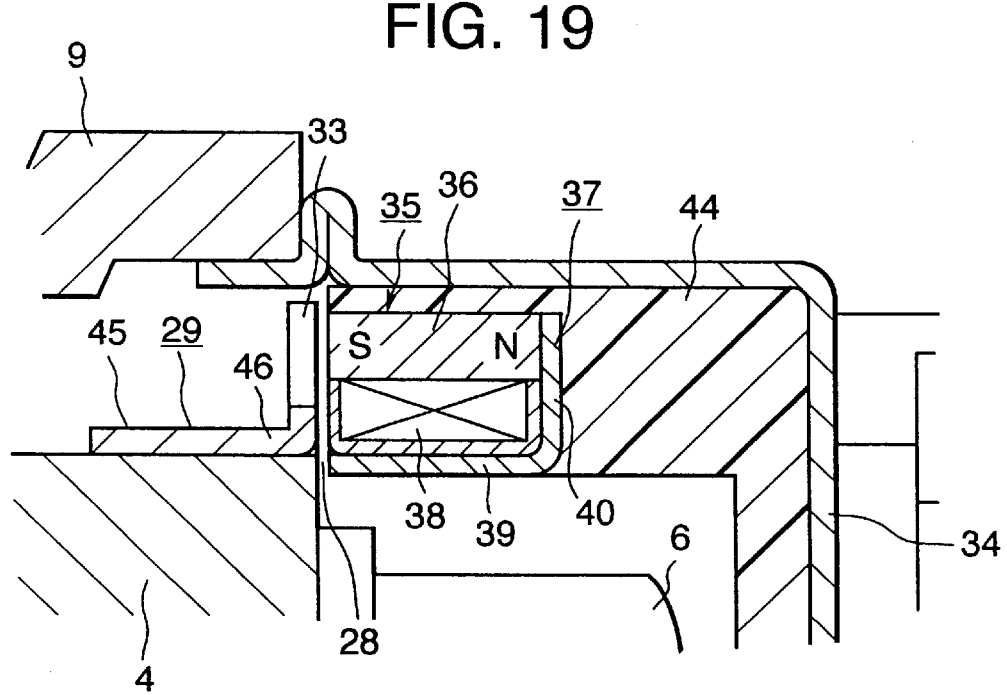
FIG. 19 is a view similar to FIG. 12 to show the sixth embodiment in the present invention, where the S pole is faced to the notches.

A third embodiment of the invention is shown in FIGS. 19 and 10. In this embodiment of the invention, the open end portion (left end in FIGS. 9 and 10) of the cover 34 is fitted around the open end portion of the outer ring member 9, so that this cover 34 is connected to and supported by the outer ring member 9. Accordingly, in this embodiment of the invention, the space between the inside peripheral surface of the cover 34 and the outside peripheral surface of the smaller diameter section 30 of the tone wheel 29 is made larger, thus making it possible to install a radially thicker sensor 35.

Moreover, in this embodiment of the invention, the cross-section of the stator 37 of the sensor 35 is substantially J shaped, so that the end of the stator 37 with the notches 41 holds the coil 38. Also, in this embodiment of the invention, the magnetic column portions 42 of the tone wheel 29, and the magnetic tongue portions 43 of the stator 37 have a larger surface area to face each other than in the first and second embodiments. When the column portions 42 and tongue portions 43 are faced to each other, it is very difficult for the magnetic flux to become saturated in the small gap or clearance 28, thus a permanent magnet 36 with a stronger magnetic flux can be used, making it possible to make the output of the sensor 35 larger.

Furthermore, in this embodiment of the invention, the area of the path through the air, which has high magnetic resistance, is made sufficiently large (wide), so it is possible to make the resistance of the path in air small. As a result, the magnetic resistance of the magnetic circuit is generally small, and the magnetic flux flowing in this circuit is larger, making the voltage (output voltage of sensor 35) generated in the coil 38 higher.

In the embodiment shown in the drawings, by bending the tongue portions 43 in the bent section 40 so that the tongue portions 43 axially extend on the same side as the retaining section 39, the cross-section of the stator 37 is formed in a J-shape. On the other hand, by bending the tongue portions 43 in the bent section 40 on the side opposite of the retaining section 39 (right side in FIGS. 9 and 10), the cross-section of the stator 37 can be formed into a crank shape. In this case, the length of the stator 37 and sensor 35 which includes the stator 37 becomes a little longer in the axial direction (left and right in FIGS. 9 and 10), however, other effects are the substantially same. The rest of the construction and use is substantially the same as the first embodiment in FIG. 4 to 6.

Figure 11:
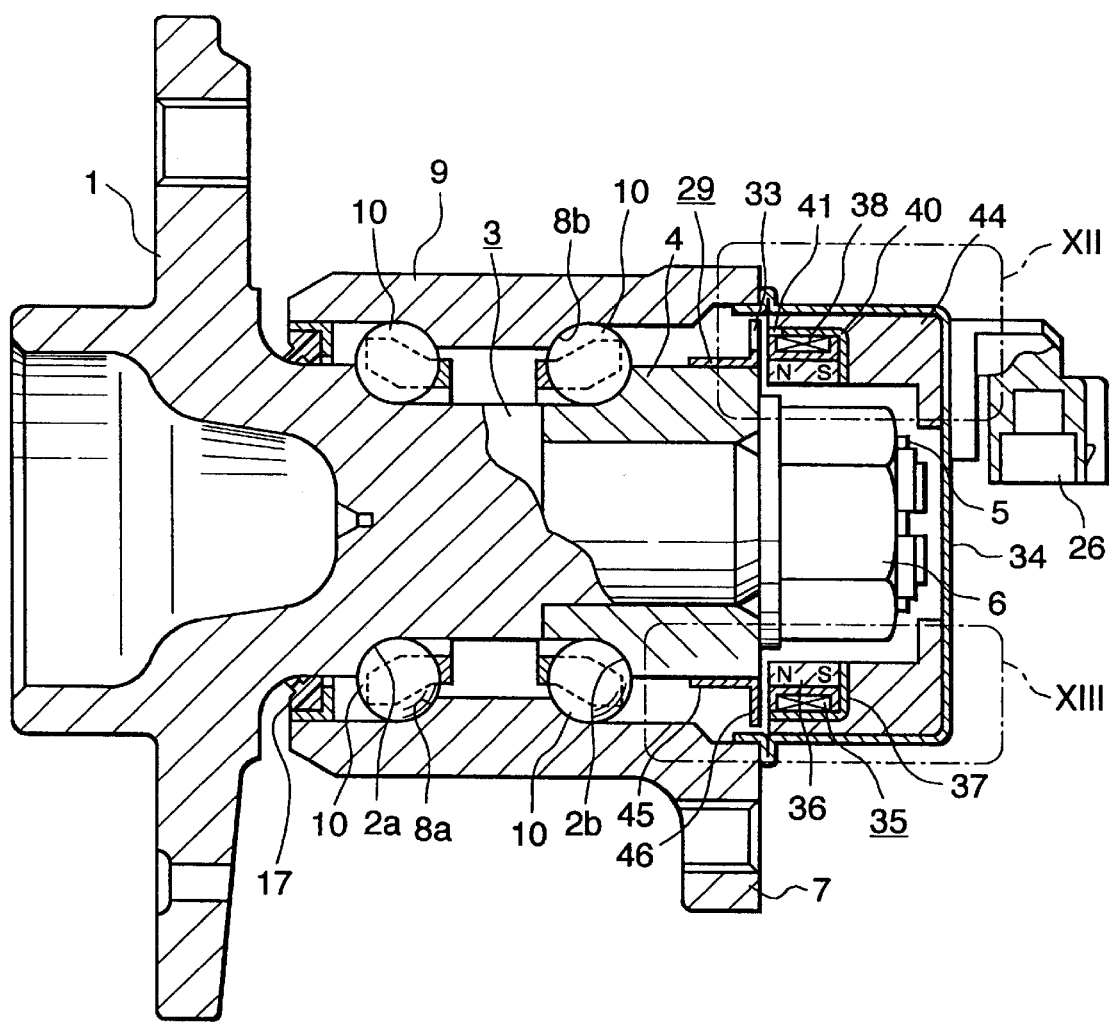
FIG. 11 is a cross sectional view to show a fourth embodiment in the present invention.
Figure 12:
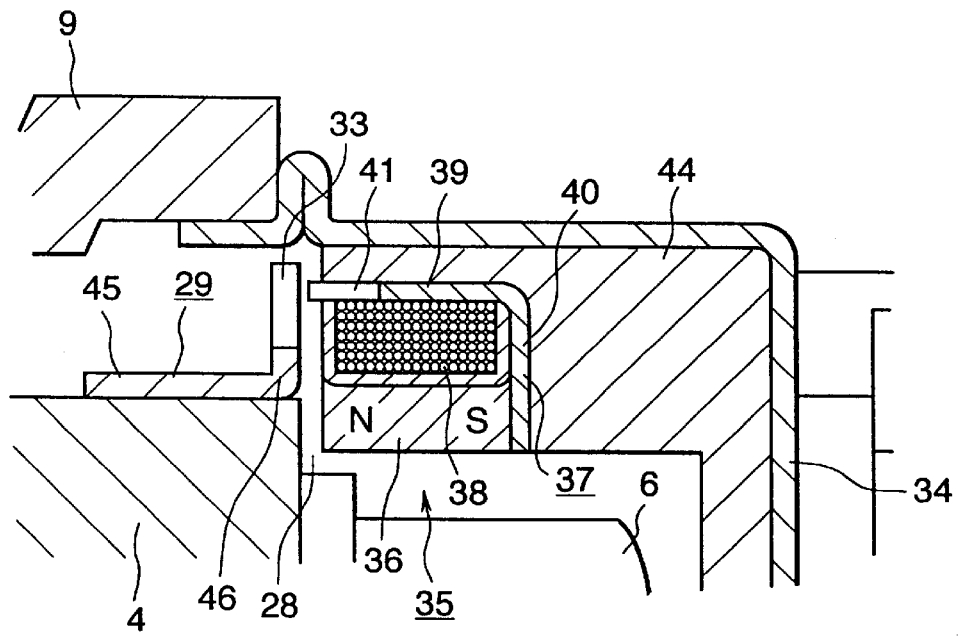
FIG. 12 is an enlarged view of the portion XII in FIG. 11.
Figure 13:
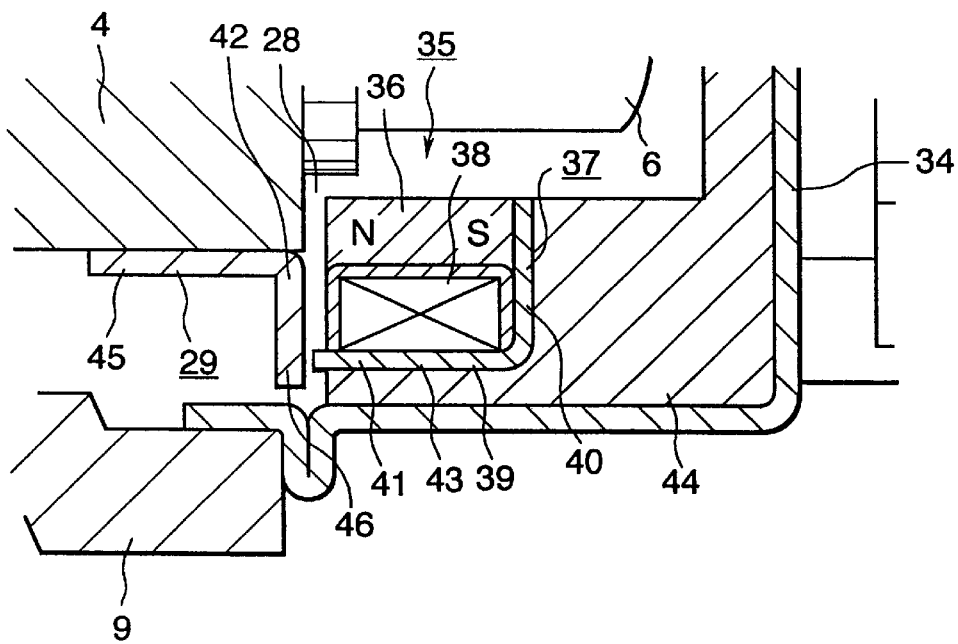
FIG. 13 is an enlarged view of the portion XIII in FIG. 11.

FIGS. 11 thru 13 show a fourth embodiment of this invention. The entire tone wheel 29 is circular and is made of magnetic metal plate such as steel plate. This tone wheel 29 has an L-shaped cross section, and comprises a cylindrical section 45 and a circular ring section 46 which is shaped as a flange and is bent outward in the radial direction from the axially inner end (right and in FIGS. 11 to 13) of the cylindrical section 45. By fitting this kind of tone wheel 29 around the outer surface on the axially inner of the inner ring member 4 made of a magnetic bearing steel, the tone wheel is supported by the inner ring member 4. Moreover, several cutouts such as notches or through-holes 33 on the rotating cutout section are formed at uniform intervals around the circumference on the radially outer half of the circular ring section 46. The circular ring section 46 is made in a comb toothed shape.

The opening on the axially inner end of the outer ring member 9 is covered with a cover 34 which is made by pressing metal plate such as stainless steel plate or an aluminum alloy plate in the same way as was done in the first embodiment. Also, a circular-shaped passive sensor 35 is fitted inside this cover 34.

This sensor 35 is equipped with a permanent magnet 36, a stator 37 made from magnetic metal plate such as steel plate, and a coil 38, and by embedding the present magnet 36, stator 37 and coil 38 in synthetic resin, the sensor 35 is made entirely annular. The permanent magnet 36 is generally ring shaped, and is magnetically oriented in the axial direction (left and right in FIGS. 11 thru 13). In other words, as shown in the example of the figure, the axially inner end face of the permanent magnet 36 (right end of FIGS. 11 thru 13) is the South pole, and the axially outer end face (left and in FIGS. 11 thru 13) is the North pole. The opposite magnetic orientation is also possible.

Moreover, the axially outer end face (N pole) of this permanent magnet 36 is faced, through a small gap 28, to the radially outside portion of the axially inner end face of the inner ring member 4, and to the radially inside edge of the circular ring section 46 of the tone wheel 29.

As in the cases of all of the other embodiments, a rare-earth permanent magnet can be used for the permanent magnet 36, however, it is also possible to use a less expensive plastic magnet or normal ferrite magnet in order to reduce the manufacturing cost.

The stator 37 is generally circular and has an L-shaped cross section. This stator 37 is equipped with a cylindrical Section or retaining section 39 and a flange-shaped circular ring or bent section 40 which is continuous with one end (right end in FIGS. 11 thru 13) of the cylindrical section 39 and goes toward the inside in the radial direction. Also, the radially inside portion of the axially outer surface (left surface on FIGS. 11 thru 13) of the circular ring section 40 is close to or preferably comes in direct contact with the axially inner end face (the right end face in FIGS. 11 thru 13) of the permanent magnet 36.

Moreover, the axially outer end edge (the left end edge in FIGS. 11 thru 13) of the cylindrical section 39 is faced to a part of the tone wheel 29 where the notches 33 are formed.

Notches 50 in the stationary cutout section are formed around the axially outer end edge of this cylindrical section 39, and they are formed with the same pitch as the notches 33 in the rotating cutout section formed around the tone wheel 29. The axially outer end edge of the cylindrical section 39 is also made in a comb toothed shape.

Furthermore, the coil 38 is circular, and fitted between the inside peripheral surface of the stator 37 and the outside peripheral surface of the permanent magnet 36. This coil 38 is wrapped so that it is piled in the radial direction between the stator 37 and permanent magnet 36. Also, the electromotive force that runs through the coil 38 is output from the connector 26 that protrudes from the outer surface of the cover 34. The construction of this section is substantially the same as that for the first embodiment.

To generate the electromotive force in the coil 36, it is possible to attach the coil 38 to the outer peripheral surface of the stator 37, however, in the case of the embodiment shown in the figures, if the coil 38 is located in the space formed between the outside peripheral surface of the permanent magnet 36 and the inside peripheral surface of the cylindrical section 39 of the stator 37, it is possible to efficiently use the limited space between the outer peripheral surface of the nut 6 and the inside peripheral surface of the cover 34.

When using the hub unit with rpm sensor of this embodiment of the invention, as the tone wheel 29 turns together with the hub 3, the density of the magnetic flux that flows in the stator 37 opposed to the tone wheel 29 changes, and the voltage generated in the coil 38 changes at a frequency proportional to the rpm of the hub 3. The mechanism used here for changing the voltage generated in the coil 38 is substantially the same as that of the first embodiment.

In other words, when the rotating notches 33 are faced to the stationary notches 41, the rotating magnetic tongue portions 42 that are located between pairs of adjacent rotating notches 33, are faced to the stationary magnetic tongue portions 43 that are located between pairs of adjacent stationary notches 41, through a small gap 28. When the rotating magnetic tongue portions 42 and stationary magnetic tongue portions 43 are faced to each other, a high-density magnetic flux flows between the tone wheel 29 and stator 37.

On the other hand, when the rotating notches 33 and stationary notches 41 are shifted half out of phase with reference to each other, the density of the magnetic flux flowing between the tone wheel 29 and stator 37 becomes low. In other words, at the same time that the notches 33 formed on the tone wheel 29 are faced to the stationary magnetic tongue portions 43, the notches 41 formed on the stator 37 are faced to the rotating magnetic tongue portions 42. When the rotating magnetic tongue portions 42 are faced to the stationary notches 41, and when the stationary magnetic tongue portions 43 are faced to the rotating notches 33, there is a relatively large space between the tone wheel 29 and the stator 37 all the way around the tone wheel 29. In this state, the density of the magnetic flux flowing between both of the tone wheel 29 and the stator 37 becomes low. As a result, the voltage generated in the coil 38 changes proportional to the rpm of the hub 3.

As in the case of the first embodiment, in order that the change in density of the magnetic flux is sufficient, the width of the rotating notches 33 and stationary notches 41, must be wider than the width of the rotating magnetic tongue portions 42 and stationary magnetic tongue portions 43. The other construction and function of this embodiment is substantially the same as that of the first embodiment.

Figure 14:
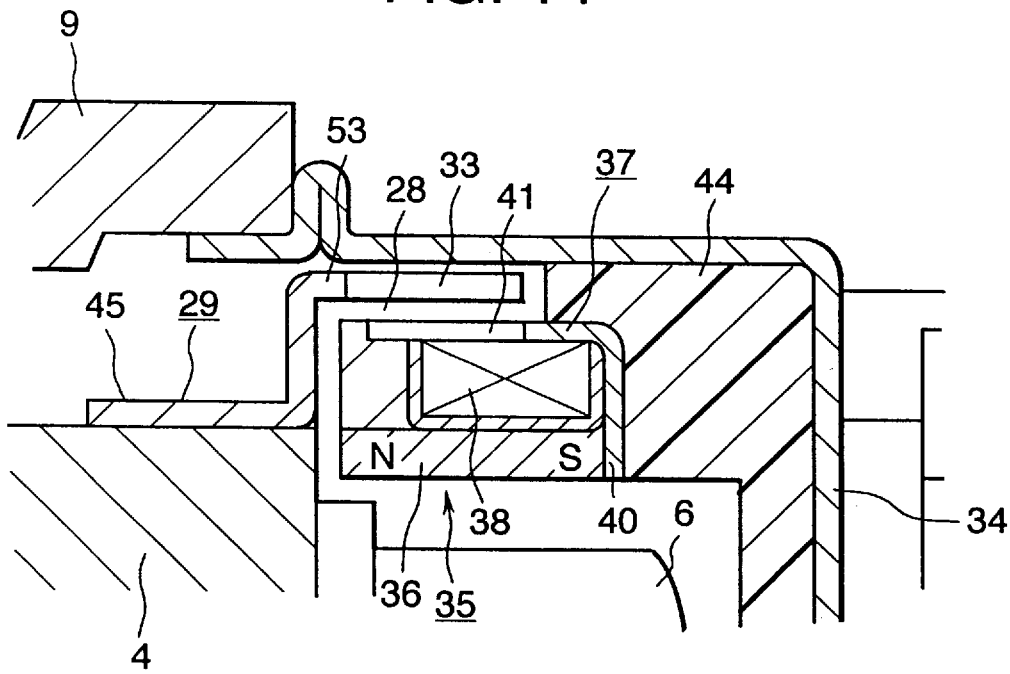
FIG. 14 is an enlarged view similar to FIG. 12 to show a fifth embodiment in the present invention.
Figure 15:
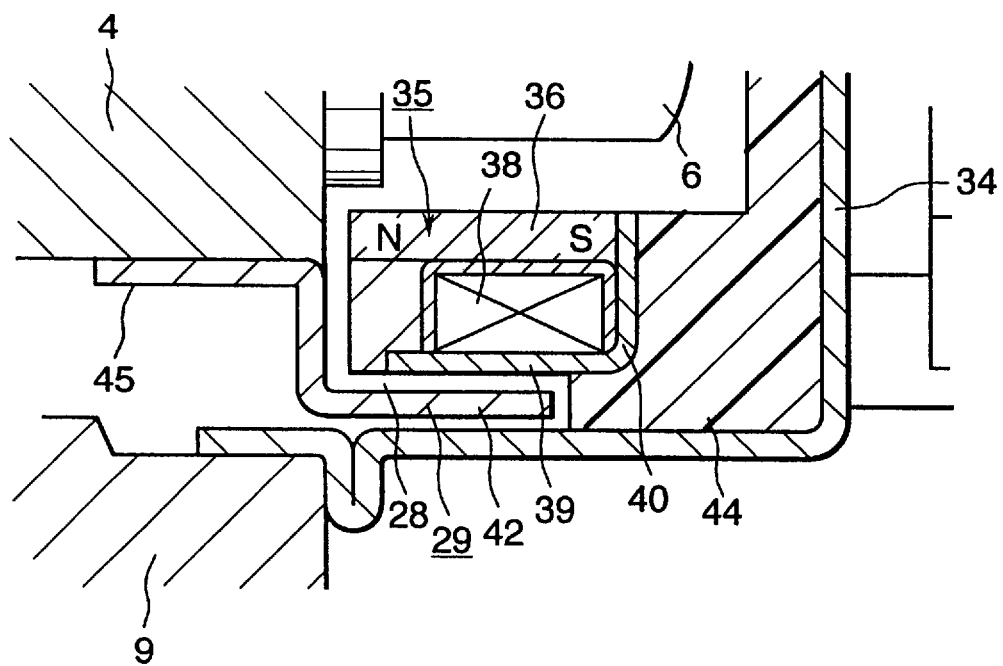
FIG. 15 is an enlarged view similar to FIG. 13 to show the fifth embodiment in the present invention.

Next, FIGS. 14 and 15 show a fifth embodiment of this invention. In this embodiment of the invention, the tone wheel 29 has a crank-shaped cross section so as to form a cylindrical section 53 on the outside, and rotating notches or through-holes 33 in the rotating cutout section are formed at uniform intervals all the way around this cylindrical section 53. Moreover, around the end portion (left end portion in FIGS. 14 and 15) of the cylindrical section 39 which makes up the stator 37, the same number of stationary notches or through-holes 41 in the stationary cutout section are formed so that they are faced to the rotating notches 33 and so that they have the same pitch in the circumferential direction. Also, the inner peripheral surface of the outer cylindrical section 53 and the outer peripheral surface of the cylindrical section 39 are faced to each other through a small clearance 28.

In this embodiment of the invention, since the surface area of the air passage (small gap) 28, which has high magnetic resistance, has been made sufficiently large, it is possible to reduce the resistance of the air passage. As a result, the magnetic resistance of the entire magnetic circuit is reduced, thus increasing the magnetic flux which flows through the magnetic circuit, and increasing the voltage (output voltage of sensor 35) generated in the coil section 38.

Moreover, since the outside cylindrical section 53 with the rotating notches 33 is located on the outer diameter side of the sensor 35, it is possible to increase the speed of the cylindrical section 39 at its peripheral and thus increase the output of the sensor 35. Furthermore, since part of the components of the sensor 35 are displaced in the axial direction from the end of the tone wheel 29, it is possible to reduce the dimensions in the axial direction of the tone wheel and to tailar the tone wheel easily.

In this embodiment of the invention, the sensor 35 is held at one end by synthetic resin 44 in a cantilever manner. Therefore, the sensor 35 may displace in the radial direction (up and down in FIGS. 14 and 15) due to vibration when the vehicle Is running, and so it is possible that the thickness (dimension in the up and down direction in FIGS. 14 and 15 of the small clearance 28 between the outside peripheral surface of the sensor 35 and the inside peripheral surface of the tone wheel 29 will change. However, in the case of the hub unit with rpm sensor of this invention, since both of the tone wheel 29 and the sensor 35 are of an annular shape, when the thickness of the small clearance 28 becomes small in the radial direction on one sides the clearance on the other side becomes large. Therefore, even if the sensor 35 Is displaced in the radial direction, there is little change in the output of the sensor 35

Figure 2:
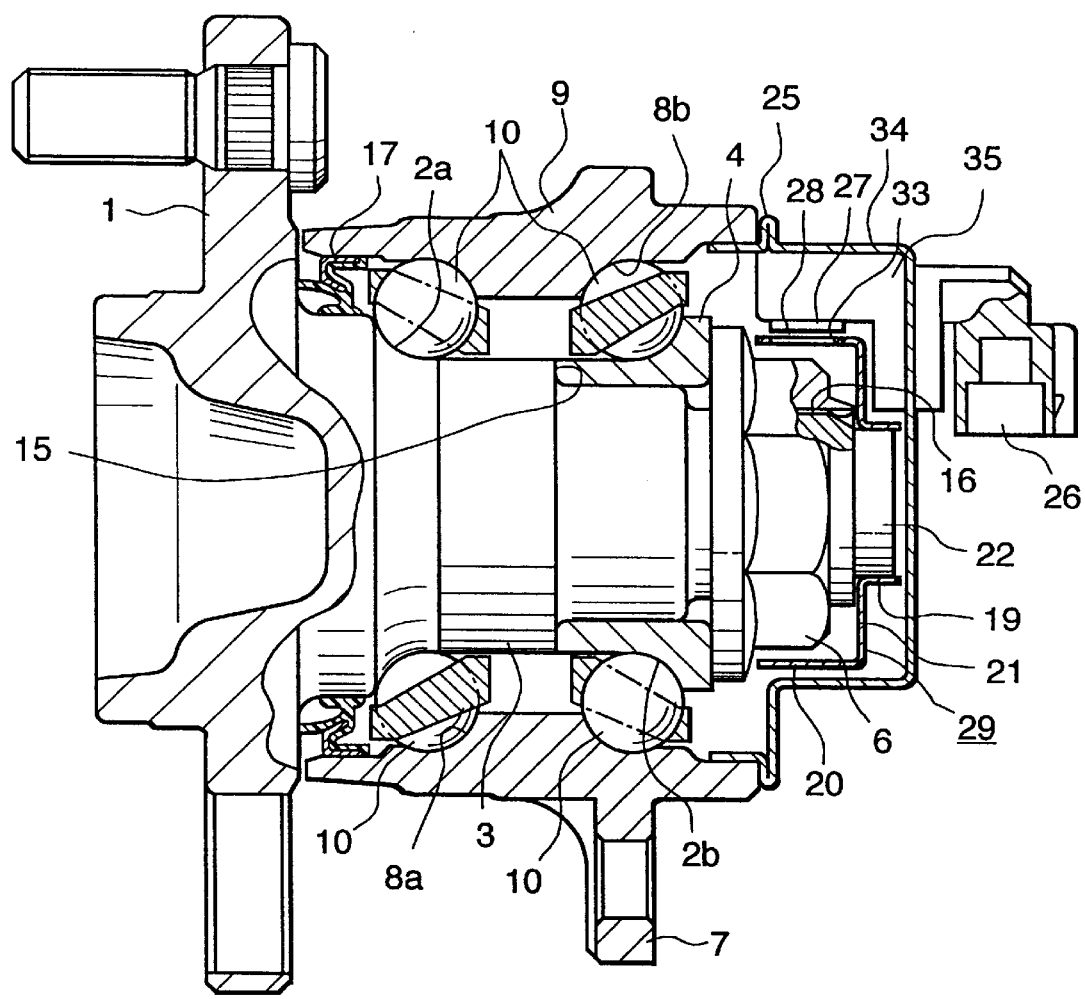
FIG. 2 is a cross sectional view of the hub unit with rpm sensor of the previous invention by the present inventor.
Figure 3:
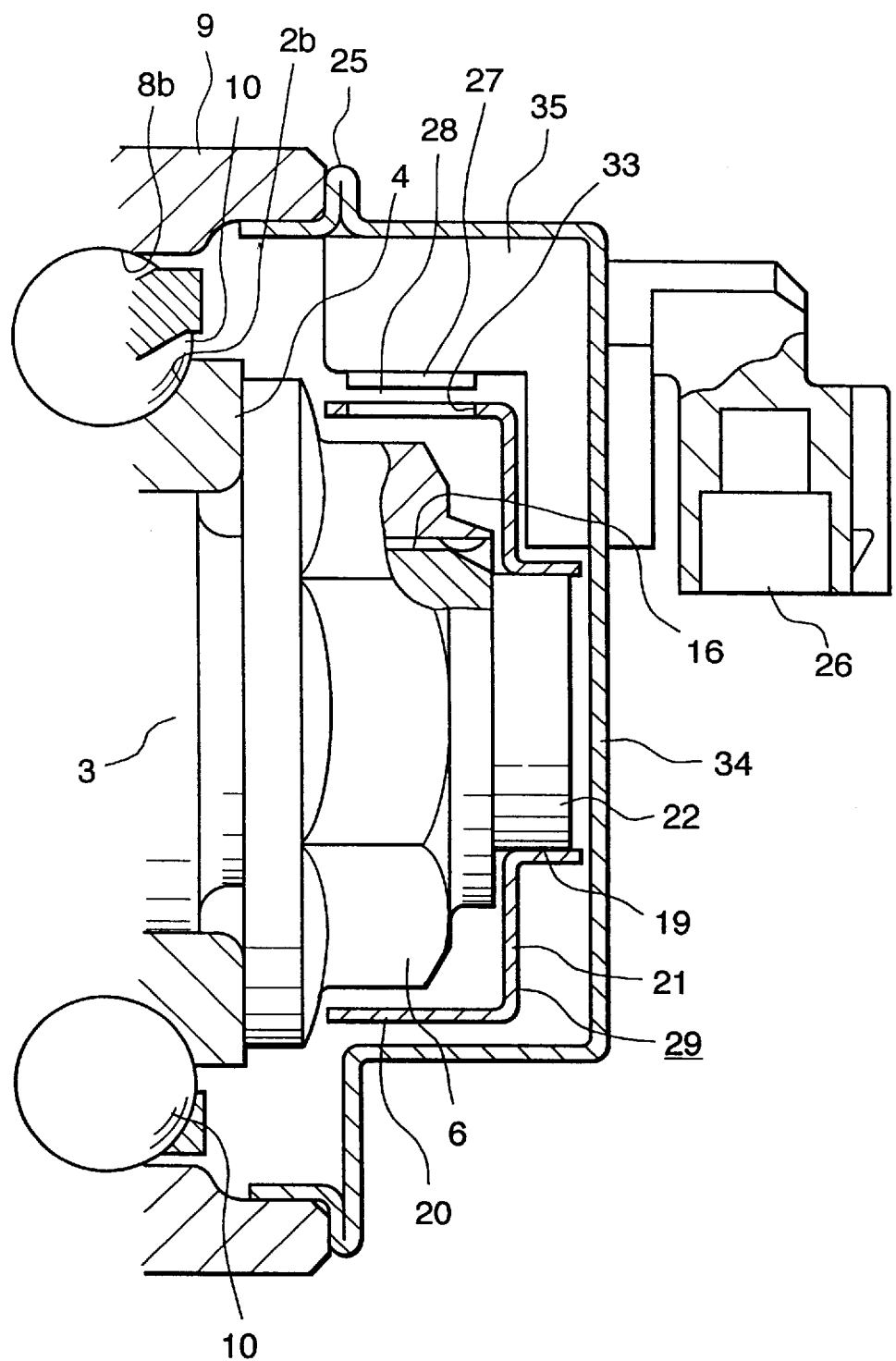
FIG. 3 is an enlarged view of a right side portion in FIG. 2.
Figure 16:
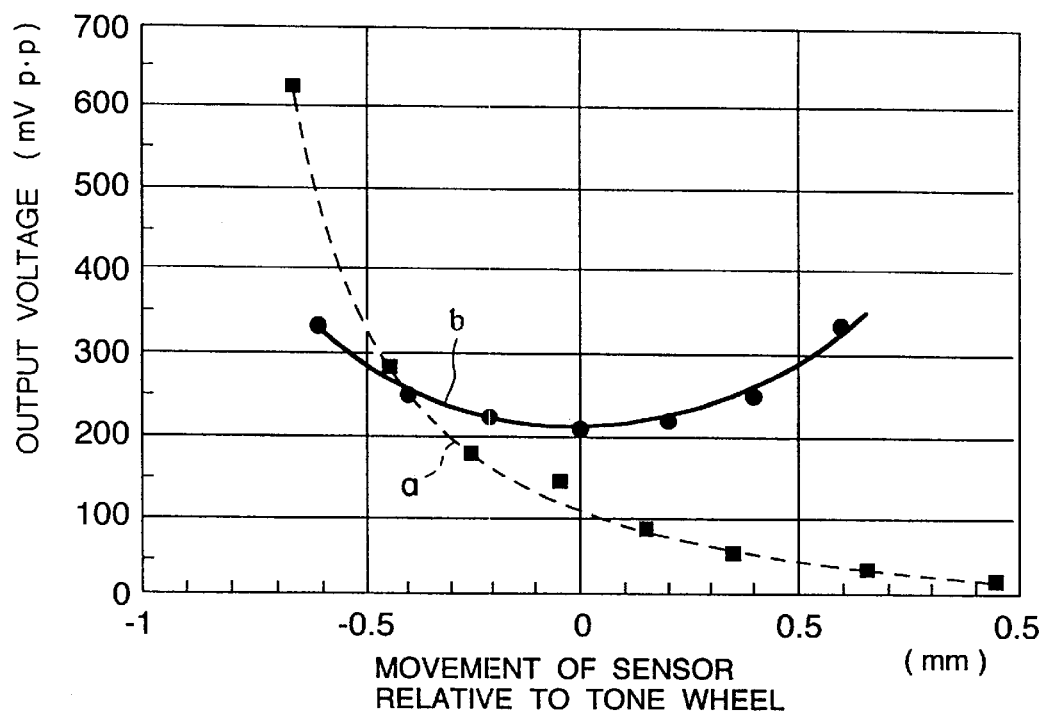
FIG. 16 is a graph to show the relation between the axial displacement of the sensor and the sensor output.

For example, as shown in FIGS. 2 and 3, if the sensor 35 is located only at a portion in the circumferential direction, the charge in output of the sensor 35 due to the displacement of the sensor is as shown by the dotted line "a" in FIG. 16. In contrast to this, when the ring-shaped sensor 35 of this invention is used, the change in output of the sensor due to the displacement of the sensor in as shown by the solid line "b" in FIG. 16. As can be clearly seen from the solid line "b", when the sensor 35 is constructed as shown in FIGS. 14 and 15, the amount that the output of the sensor 35 changes, even when the sensor 35 is radially displaced, poses no practical problem.

With the construction of this invention, it is possible to support the sensor 35 at only one end with synthetic resin in a cantilever manner. However, if it is necessary to prevent the sensor 35 and tone wheel 29 from coming in contact with each other, or if it is necessary to suppress the displacement of the sensor 35 for some reason other than maintaining the output, it is possible to suppress the displacement of the sensor 35 by supporting it using a metallic part that is fixed to the cover 34.

In the construction of this embodiment, by extending the cylindrical section of the stator 37 to the tone wheel 29, it is possible to decrease the length in the axial direction of the tone wheel 29. By doing this, there is no longer any danger of the tone wheel 29 whirling or rotating unbalanced. Moreover, the overlapping length in the axial direction of the sensor 35 and the tone wheel 29 bees shorter, thus it is possible to prevent the sensor 35 from coming into contact with the tons wheel 29. The angle allowed when inserting the sensor cover 34 becomes larger, and when the cover 34, which supports the sensor 35, is inserted into the outer ring member 9, there is little danger of the sensor 35 coming in contact with the tone wheel 29, thus making it possible to prevent damage to both of the sensor 35 and the tone wheel 29.

If this embodiment of the invention where the annular permanent magnet 36 and the annular coil 38 are overlapped in the radial direction is applied to the construction where the height of the cross section In the radial direction is not high, the cross-sectional plate thickness of the permanent magnet 36 is 3.5 mm or less. It is very difficult to obtain this kind of plate thickness by processing the permanent magnet 36 using sintering. Also, the pressure generated when molding it in one piece with the cover, increases the fear of cracking of the sintered permanent magnet. In this case, if a plastic magnet is used instead of a sintered permanent magnet, the toughness is improved, making it possible to decrease the thickness of the permanent magnet 36, and to obtain more cross-sectional space for the coil 38. This embodiment shows an example of using a plastic magnet for the permanent magnet where the cross-sectional thickness of 36 is 3.5 mm or less.

Figure 20:
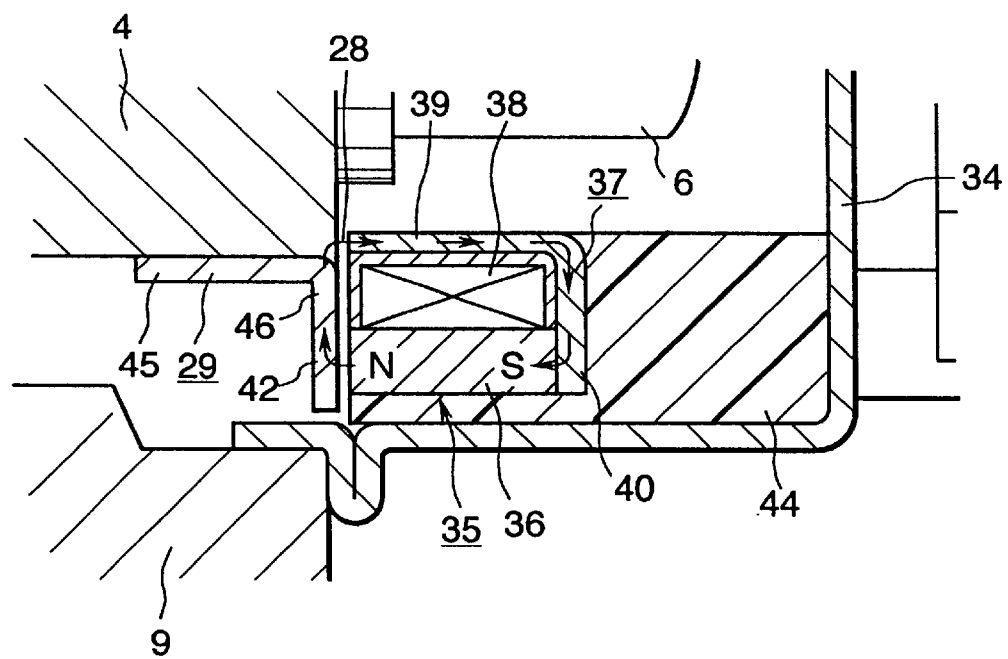
FIG. 20 is a view similar to FIG. 13 to show the sixth embodiment in the present invention, where the N pole is faced to the magnetic tongue portions.
Figure 21:
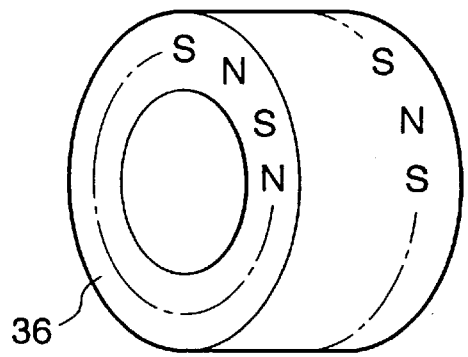
FIG. 21 is a perspective view of the permanent magnet for use in the sixth embodiment in the present invention.

Next, FIGS. 17 thru 21 show a sixth embodiment of this invention. The sensor 35 of this embodiment is, as in the fourth and fifth embodiments mentioned above, equipped with a permanent magnet 36, a stator 37 made from magnetic material such as steel plate, and a coil 38. Also, the entire sensor is made annular by embedding all of the sensor 35, permanent magnet 36, stator 37 and coil 38, in synthetic resin 44. The permanent magnet 36 is formed entirely in a ring shaped as shown in FIG. 21, and the magnetic orientation in in the axial direction. The magnetic orientation alternates all the way around the permanent magnet, with each orientation having the same pitch. The number of times the magnetic orientation changes (number of boundaries between South and North poles) is twice the number of notches 33 formed around the tone wheel 29. Also, on the both end faces in the axial direction of the permanent magnet 36, there is the same number of both South and North poles as there are notches 33, and these S and N poles have the same pitch as the notches 33.

Moreover, the stator 37 is formed entirely in an annular shape with an L-shaped cross section. In other words, this stator 37 has a cylindrical section 39, and a flange-shaped ring section or bent section 40 that bends outward in the radial direction (up and down in FIGS. 17 thru 20) from the axially inner end edge (right end edge in FIGS. 17 thru 20) of this cylindrical section 39. Also, the axially outer end edge (left end edge in FIGS. 17 thru 20) of the cylindrical section 39 is faced, through a small gap 28, to a surface of the axially inner end of an inner ring 4, which is made of magnetic material.

It is possible to increase the opposing area between the stator 37 and inner ring 4 by bending the axially outer end (left end in FIGS. 17 thru 20) of the cylindrical section 39 at right angles in the radial direction toward the outside or inside. This embodiment is different from the other previously described embodiments in that there are no stationary cutout section such as notches around the stator 37.

Furthermore, the coil 38 is formed in an annual shape, and is located in the space between the inner peripheral surface of the permanent magnet 36 and the outer peripheral surface of the stator 37. The voltage that is generated in this coil 38 is output from a connector (see FIG. 4) that protrudes through the outer surface of the cover 34.

In order to generate voltage in this coil 38, it is possible to attach the coil 38 around the inner peripheral surface of the cylindrical section 39 of the stator 37, however, in this embodiment, as shown in the figures, by placing the coil 38 in the space between the inner peripheral surface of the permanent magnet 36 and the outer peripheral surface of the cylindrical section 39, it is possible to more efficiently utilize the space, in the same way as was done for all of the other previously described embodiments.

When using the hub unit with rpm sensor of the embodiment of the invention described above, as the tone wheel 29 rotates together with the hub 3, the density of the magnetic flux inside the stator 37, which is faced to the axially inner end face of the inner ring 4 that is magnetically linked to the tone wheel 29, changes together with the direction of flow of the magnetic flux. Also, in response to this, the amount and direction (plus and minus) of the voltage generated in the coil 38 changes with a frequency proportional to the rpm of the hub 3. The principle that the change in voltage generated in the coil 38 corresponds to the change in density of the magnetic flux flowing in the stator 37 is the same as that widely used in the prior art rpm sensor, and therefore an explanation of it is omitted.

The reason that the direction of flow of the magnetic flux flowing in the stator 37 changes in response to the rotation of the tone wheel 29 will be explained below.

As described above, the pitch of the rotating notches 33 located around the tone wheel 29 is the same as the pitch of a pair of poles (pair of South poles or a pair of North poles) of the South poles and North poles alternately located around the end surface of the permanent magnet 36. Therefore, as the tone wheel 29 rotates, all of the South poles (or all of the North poles) are simultaneously faced to all of the notches 33 all the way around. Also, when identical poles are faced to all of the notches 33, all of the other poles are faced to the rotating magnetic tongue portions 42 located between the adjacent notches 33.

Figure 17:
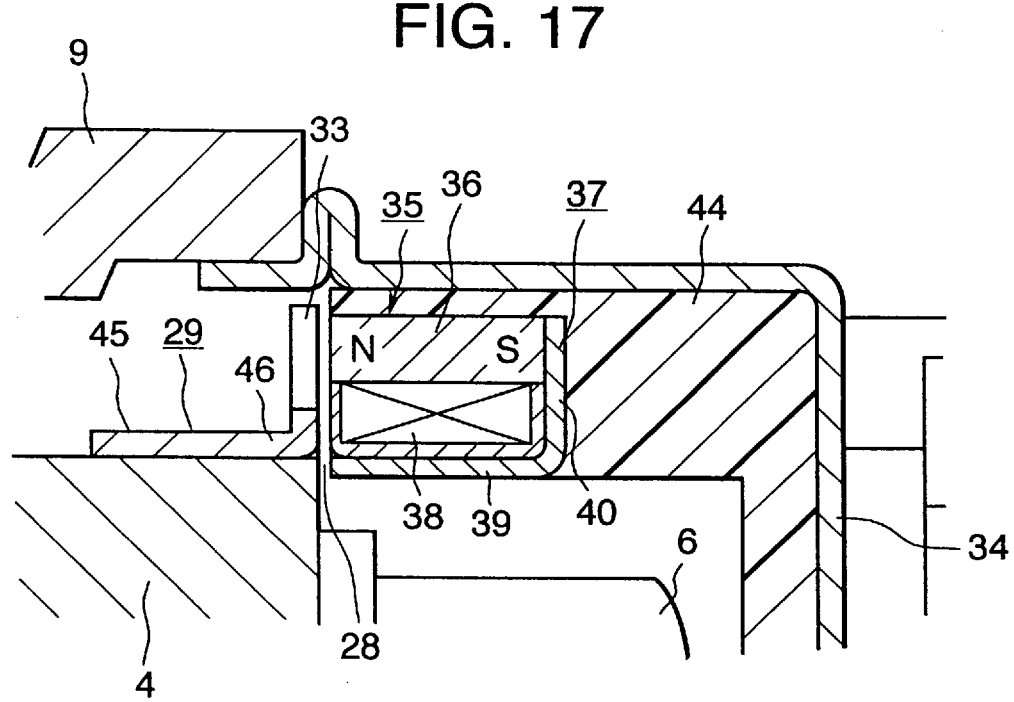
FIG. 17 is a view similar to FIG. 12 to show a sixth embodiment in the present invention, where the N pole is faced to the notches.
Figure 18:
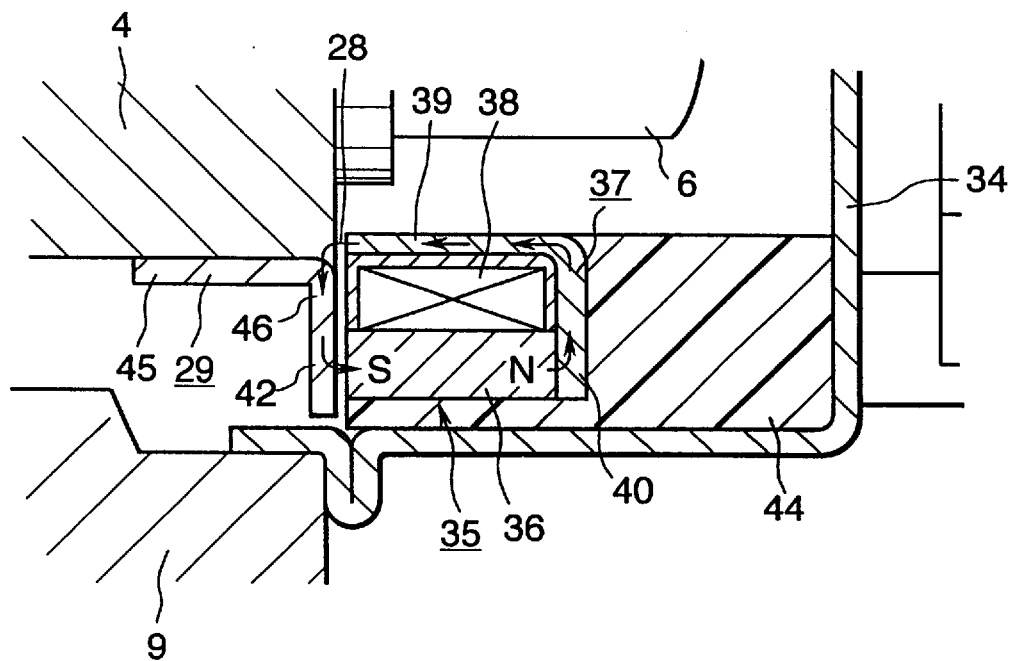
FIG. 18 is a view similar to FIG. 13 to show the sixth embodiment in the present invention, where the S pole is face to the magnetic tongue portions.

First, as shown in FIG. 17, when all of the North poles located on the axially outer end face of the permanent magnet 36 are faced to all of the notches 33, the magnetic resistance between each North pole and the tone wheel 29 becomes large, and it becomes difficult for magnetic flux to flow from the North poles toward the tone wheel 29. At this same time, as shown in FIG. 18, the South poles, located on the axially outer end face of the permanent magnet 36, are faced to all of the rotating magnetic tongue portions 42. In this state, the magnetic resistance between each South pole and the tone wheel 29 becomes low, and the magnetic flux flows through the stator 37 to the tone wheel 29, and then flows to the South poles of the permanent magnet 36 through the small clearance 28. In other words, in this state, the magnetic flux inside the stator 37 flows from the inside to the outside of the cylindrical section 39 all the way around the stator 37, as shown by the arrows in FIG. 18.

In contrast to this, when the South poles, located on one end face of the permanent magnet 36, are faced to all of the notches 33 as in FIG. 19, the North poles, located on the other end face of the permanent magnet 36, are faced to all of the rotating magnetic tongue portions 42, as shown in FIG. 20. In this state, the magnetic flux inside the stator 37 flows In the direction opposite of that described above, from the outside to the inside of the cylindrical section 39 all the way around the stator 37, as shown by the arrows in FIG. 20.

In comparing the width of each of the notches 33 in the circumferential direction with the width of each of the rotating magnetic tongue portions 42 in the circumferential direction, it is desirable if the width of the notches 33 is greater than the width of the magnetic tongue portions 42 so that the change in the density of the magnetic flux is greater.

The facing state of each of the S and N poles with the notches does not change instantaneously, but changes continuously as the tone wheel 29 rotates. Also, the change between the state when the magnetic flux flows in the direction shown in FIG. 18, and the voltage in that direction (for example +) becomes large, and the state when the magnetic flux flows in the direction shown in FIG. 20, and the voltage in the opposite direction (for example −) becomes large, is made continuously through an intermediate state where the state where the South poles and North poles both are faced to the notches about the same and the density of the magnetic flux in the stator 37 is about zero. Accordingly, alternating current is generated in the coil 38 located around the stator 37.

In the sensor 35 of this embodiment of the invention, when identical poles, the South poles or North poles formed on axially outer end face of the permanent magnet 36, are simultaneously faced to the notches 33 around the tone wheel 29 or the rotating magnetic tongue portions 42, alternating current is generated in the coil 38. Also, the difference between the maximum and minimum output of the sensor 35 becomes large, thus improving the reliability of the rpm sensor when compared with the previously described embodiments. In other words, when all of the South poles are faced to the notches 33, and at the instant when the density of the magnetic flux flowing in the direction of the arrows shown in FIG. 20 becomes large, +E is generated in the coil 38, and when all of the North poles are faced to the notches 33, and at the instant when the density of the magnetic flux flowing in the direction of the arrows shown in FIG. 18 becomes large, −E is generated in the coil 38. In this case, an ABS or TCS controller can use the 2E potential difference as the output from the sensor 35.

In the case of the construction of prior art devices or the previous invention, however, voltage is generated in the coil by only changing the density of the magnetic flux without changing the direction of the magnetic flux, so that only the E potential difference can be used. Therefore, it is clear that this sixth embodiment efficiently increases the output of the sensor. However, since it is difficult to make the pitch of adjacent South poles and North poles very small all the way around in the circumferential direction, it is not possible to improve the precision of the rpm sensor (it is difficult to accurately detect the speed at slow speeds). The reason for this will be explained later. The other parts, construction and function of this embodiment are substantially the same as in the previously described embodiments.

Incidentally, although In the embodiment in FIGS. 19 and 20 the permanent magnet 36 is magnetized in multi-ploss on both of the axially inner and outer end faces, the axially inner end face of the permanent magnet 36 is not necessarily magnetized.

Figure 22:
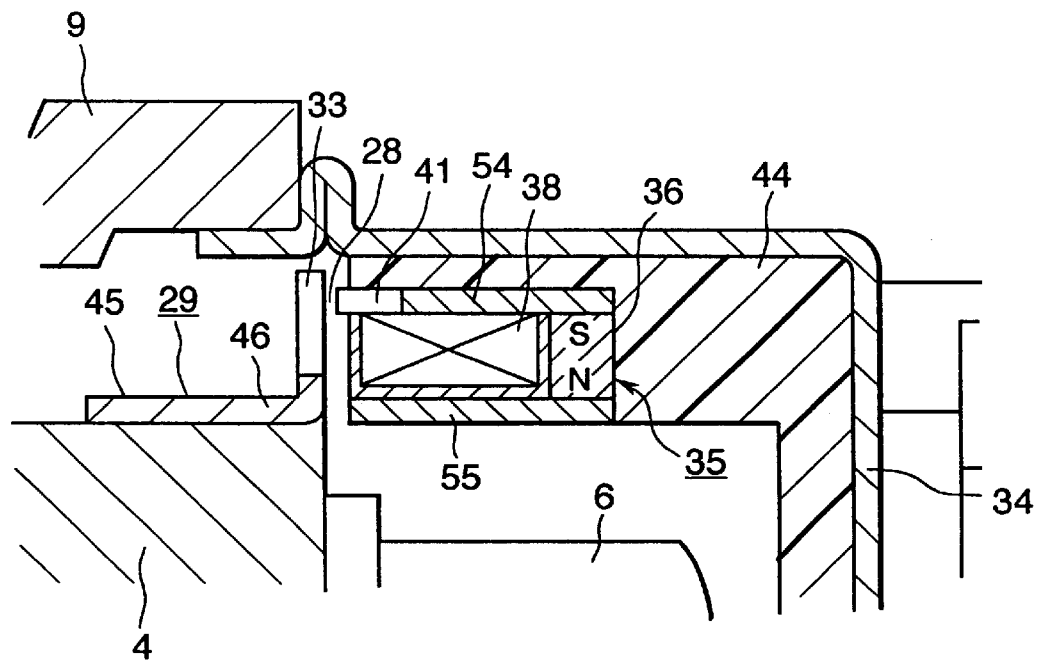
FIG. 22 is a view similar to FIG. 12 to show the seventh embodiment in the present invention, where the notches of the stator are faced to those of the tone wheel.
Figure 23:
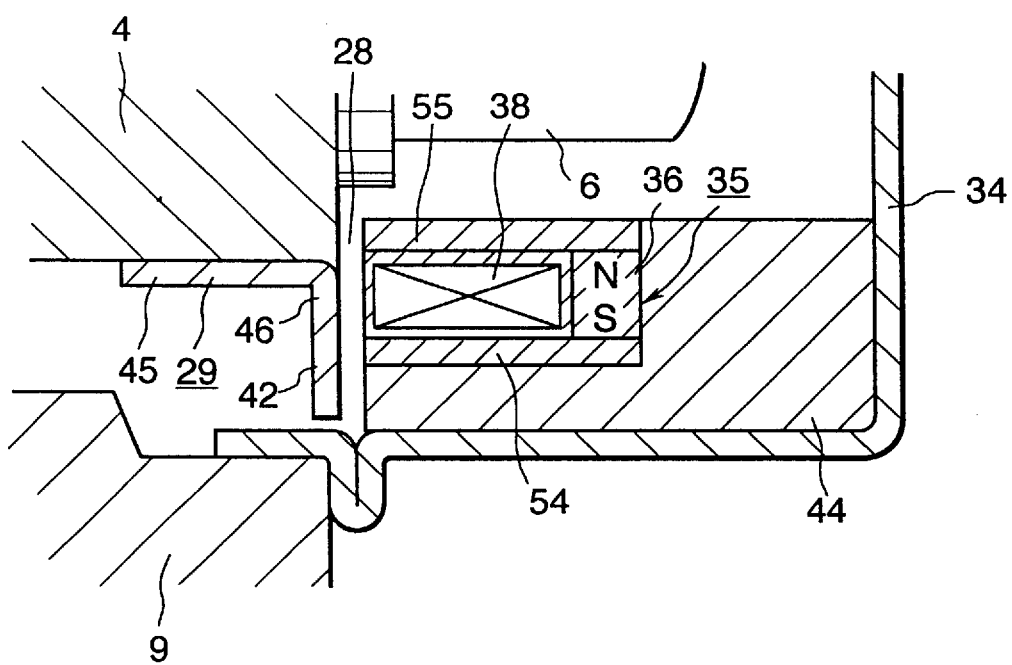
FIG. 23 is a view similar to FIG. 13 to show the seventh embodiment in the present invention, where the magnetic tongue portions of the stator are faced to those of the tone wheel.

FIGS. 22 and 23 show a seventh embodiment of this invention. In this embodiment, the magnetic orientation of the permanent magnet 36 is in the radial direction (up and down in FIGS. 22 and 23). There is no change in the magnet orientation around the circumference. Also, the same pole (North pole in the example shown in the figure) goes entirely around the inner peripheral surface of the permanent magnet 36, and in the like manner, the same pole (South pole in the example shown in the figure) goes entirely around the outer peripheral surface. Moreover, the stator comprises a first stator section 54 and a second stator section 55 which are coaxial with each other.

The first stator section 54 is located on the outside in the radial direction, and the inner peripheral surface on the axially inner end portion (right end portion in FIGS. 22 and 23) of the first stator section 54 comes in contact with or is very close to the outer peripheral surface of the permanent magnet 36.

Moreover, the second stator section 55 is located on the inside in the radial direction, and the outer peripheral surface on the axially inner end portion (right end portion in FIGS. 22 and 23) of the second stator section 55 comes in contact with or is very close to the inner peripheral surface of the permanent magnet 36.

Also, the notches 41 in the stationary cutout portion are formed on the axially outer end portion (left end portion in FIGS. 22 and 23) of the first stator section 54. In other words, there is the same number of these notches 41 as the notches 33 in the rotating cutout portion that are formed around the tone wheel 29, and they have the same pitch as notches 33 all the way in the circumferential direction. The section with these notches 41 formed is faced, through a small clearance 28, to the rotating cutout section of the tons wheel 29 with the rotating notches 33 formed to be detected.

The magnetic circuit of this embodiment is substantially the same as the previously described fourth embodiment. However, in the fourth embodiment in FIGS. 11 to 13, the axially outer end face of the permanent magnet 36, which is magnetically oriented in the axial direction, is directed to the radially inside peripheral edge portion of the tone wheel 29 and to the radially outside edge portion of the axially inner end face of the inner ring 4 through a small clearance 28, while in this embodiment, the magnetic flux, which flows from the inner peripheral surface of the permanent magnet 36, magnetically oriented in the radial direction, is directed by the second stator section 55 to the radially inside peripheral edge portion of the tone wheel 29 and to the radially outside edge portion of the axially inner end face of the inner ring 4. Also, in this embodiment, as in the previously described fourth embodiment, the density of the magnetic flux flowing in the first and second stators 54, 55 changes, and the voltage generated in the coil 38 changes with a frequency that is proportional to the rpm of the rotating ring member 9.

As a modification of this embodiment, it is possible to also form stationary notches 41 around the axially outer edge portion of the second stator section 55 in addition to around the axially outer edge portion of the first stator section 54. In this case, the phase of the stationary notches on both of the stators 54, 55 are matched, and the axially outer edge portion of both stators 54, 55 are faced to the rotating notches 33 formed around the tone wheel 29. With this kind of construction, it is possible to increase the change in density of the magnetic flux that flows in the first and second stators sections 54, 55 as the tone wheel 29 rotates.

Moreover, in the construction shown in FIGS. 22 and 23, by bending the axially outer end of the first stator section 54 outward or inward in the radial direction, it is possible to increase the amount of surface areas of the stationary cutout section where the notches 41 are formed and of the rotating cutout section of the tone wheel 29 that are faced to the stationary cutout section, However, in the case where the axially outer end of the first stator section 54 is bent inward in the radial direction, care must be taken so that the edge of the bent section does not come too close to the axially outer edge of the second stator section 55. If it comes too close, magnetic flux flows directly between the first stator section 54 and the second stator section 55, and it becomes impossible to detect the rpm. In thin same way, by bending the axially outer end of the second stator section 55 in the radial direction, it is possible to reduce the magnetic resistance between the second stator section 55 and the tone wheel 29 or inner ring member 4. In this case as well, if the end of the second stator section 55 is bent outward in the radial direction, care must be taken so that the axially outer edge of the second stator section 55 does not come too close to the edge of the first stator section 54. In this embodiment, and in the first thru fifth embodiments described above, the accuracy of rpm detection is improved when compared with the sixth embodiment, and in the case of these embodiments, the permanent magnet 36 can be easily manufactured, thus making parts replacement less expensive.

The reason why it is possible to improve the precision of rpm detection when the magnetic orientation of the permanent magnet does not change all the way around in the circumferential direction, will be explained below.

When the South poles and North poles are arranged so that they alternate in the circumferential direction, it is necessary to keep small the magnet flux that flows directly (not through the tone wheel) between adjacent South and North poles. For example, if the ratio (P/T) is small in the relation between the alternately, repeated pitch "P" of the South and North poles in the circumferential direction, and the thickness "T" of the small clearance between the tone wheel and the end surface in the direction of magnetic orientation of the permanent magnet, the percentage of magnetic flux flowing directly from each North pole to the adjacent South poles becomes large.

Figure 24:
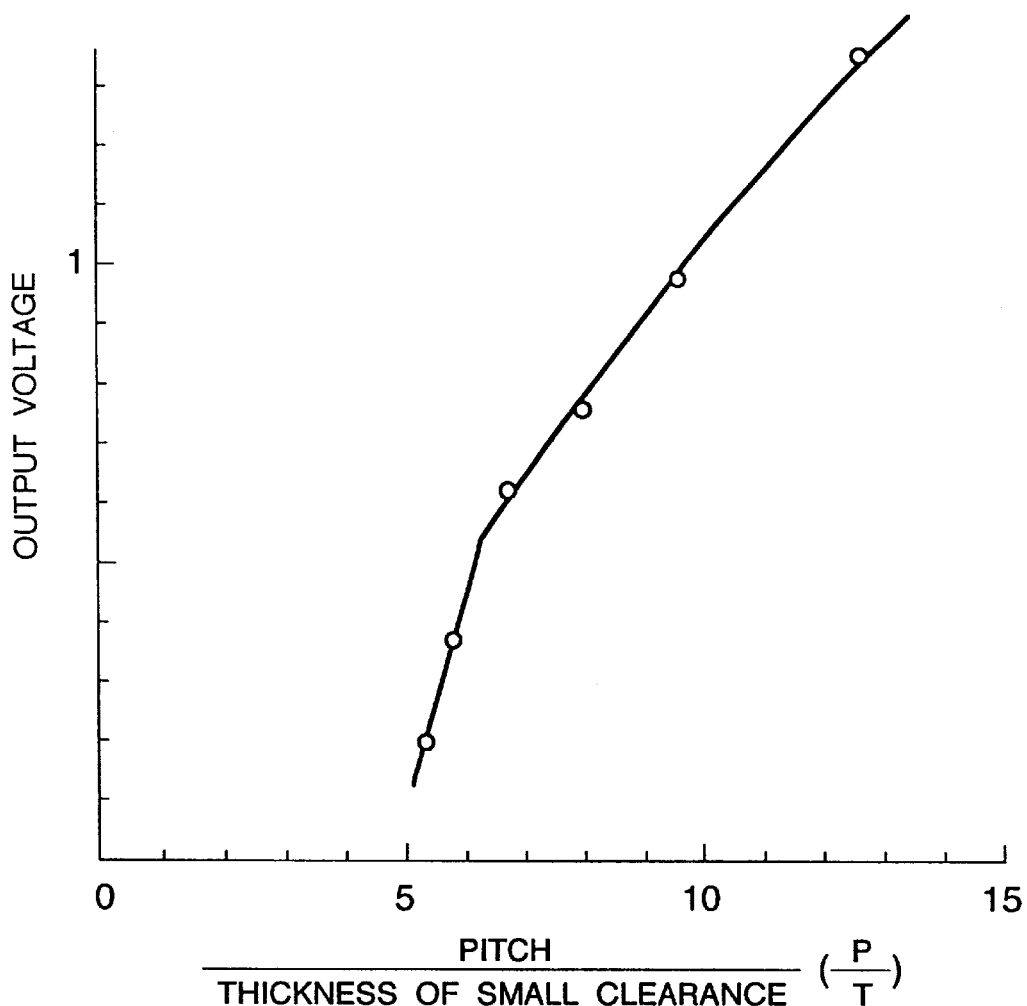
FIG. 24 is a graph to show the relation between the sensor output and the ratio of the pitch of the S and N poles and notches to the thickness of the small clearance.

FIG. 24 shows the case of using a permanent magnet whose magnetic orientation changes in the circumferential direction, and it shows the results of a test performed by the inventors to find the effects of the ratio "P/T" on the output voltage of the sensor. In FIG. 24, the voltage output of the sensor is taken to be 1.0 when the ratio "P/T" in 10, and the figure shows how the output changes as the ratio changes. As can be clearly seen from FIG. 24, when the ratio "P/T" is near 6.5, the voltage output drops suddenly.

The thickness "T" of the small clearance between the tone wheel and the end surface in the direction of magnetic orientation of the permanent magnet, must be at least 0.6 mm. this is in order to prevent the sensor from coming into contact with the tone wheel, regardless of elastic deformation and the like of components that occurs while the hub unit is placed in operation.

Also, the alternately, repeated pitch "P" of the South and Not poles on the end face in the direction of magnet orientation of the permanent magnet (this is the same as the pitch of the notches formed around the tone wheel) must be at least 3.9 mm (0.6 mm×6.5) in order to obtain sufficient output. If the pitch is too large (3.9 mm or more), it is not possible to increase the number of North and South poles in the circumferential direction and the number of notches formed in the tone wheel. If it is not possible to increase the number of North and South poles end the number of notches in the tone wheel, the number of changes in output per each revolution becomes less (the interval between output changes becomes lamer), and thus it becomes impossible to know the accurate rpm at slow speeds. In other words, the precision of rpm detection decreases.

In contrast to this, if a permanent magnet is used whose magnetic orientation does not change in the circumferential direction, most of the magnet flux flows through the tone wheel even if the pitch of the rotating and stationary cutout sections is 3.9 mm or less. As a result, the characteristics are different from those shown in FIG. 24, and there is no sudden decrease in output even when the pitch of the notches sections is 3.9 mm or less. Also, it is possible to improve the precision of rpm detection by decreasing the pitch in the cutout sections.

In all of the previously described embodiments of the invention, in order to accurately detect the rpm, it is desired that the maximum density of the magnetic flux (maximum magnetic flux density) that leaves the and of the permanent magnet and flows toward the stator and tone wheel be at least 1000 Gauss. The reason for this is that the sensor, which is part of the rpm detector built into the hub unit, is always exposed to external magnetic fields end to residual magnetism of the components of the hub unit. In order to know the accurate rpm, it is necessary to keep the effects of external magnetic fields and residual magnetism as small as possible.

The error in pitch of the notches or through-holes of the rotating and stationary cutout sections should be kept within 1 to 2%. Also, in order to accurately detect the rpm, it is recommended that the effects due to external magnetic fields and residual magnetism be kept within 1 to 2%. In regards to this, the residual magnetism in the inner ring member and outer ring member of the hub unit is normally about 10 gauss. In order to keep the effects of this residual magnetism to within 1%, it is necessary that the maximum density of the magnetic flux be 1000 Gauss or more.

If the magnetic orientation does not change around the circumference of the permanent magnet, no real problem occurs even if the maximum magnetic flux density is more than 1000 Gauss. In contrast to this, if the South and North poles alternate around the permanent magnets, the percentage of magnetic flux flowing directly from each of the North poles to the adjacent South poles becomes large, and so the output of the sensor decreases. Therefore, from this aspect as well, in order to accurately detect the rpm, it is best if the magnetic orientation does not change around the circumference of the permanent magnet.

Figure 1:
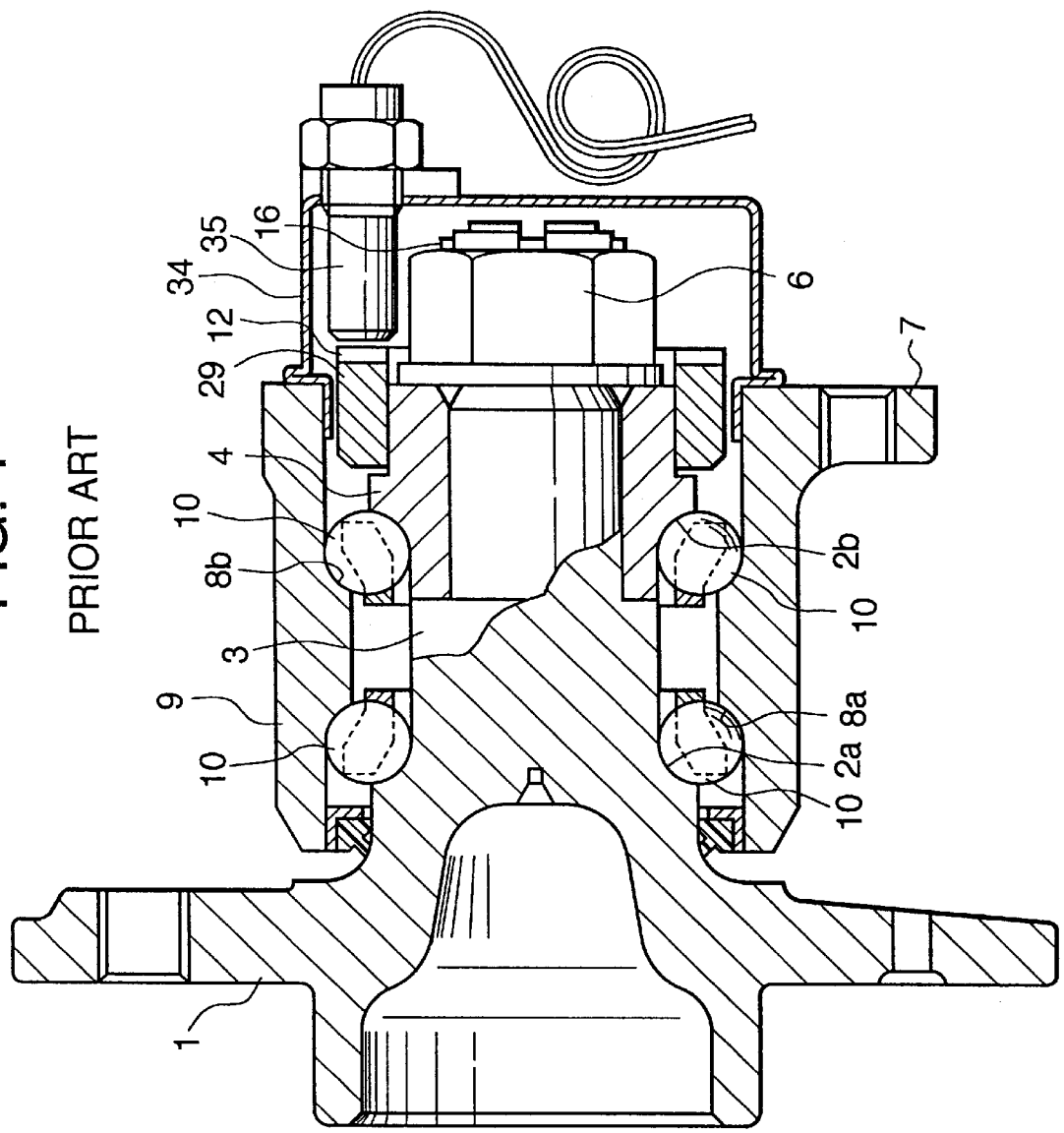
FIG. 1 is a cross sectional view of one example of the prior art hub unit with rpm sensor.

Moreover, in the case of using the annular or ring-shaped sensor of this invention, where the whole peripheral surface of the sensor is faced to the whole peripheral surface to the tone wheel, the output of the sensor is very stable regardless of the position of the sensor with respect to the tone wheel. In other words, in the case of prior art construction as shown in FIGS. 1 thru 3, the output of the sensor changes as shown by the dotted line "a" in FIG. 16 as the position of the sensor moves with respect to the tone wheel. In regards to this, if a ring-shaped sensor is used, the output of the sensor changes us shown by the solid line "b" in FIG. 16 when the position of the sensor moves with respect to the tone wheel. As can be clearly seen from FIG. 16, by using the annular or ring-shaped sensor of this invention, it is possible to stabilize the output of the sensor. The reason for this is that when the distance between the peripheral surface of the sensor and the peripheral surface of the tone wheel is large on one side, it is very small on the opposite side, and so there is no large effect on the sensor output as a whole.

In all of the embodiments shown in the drawings, this invention is used in a hub unit which supports a free wheel (front wheel for a front engine rear wheel drive (FR), and rear wheel for a front engine front wheel drive (FF) vehicle), and therefore the covers 34 which support the sensor 35 close off the axially inner end. However, this invention is not limited to use in the hub unit of a free wheel, but can also be used in the hub unit for a driving wheel (rear wheel for a FR vehicle, a front wheel for a FF vehicle). When this invention is used in the hub unit of a driving wheel, the cover is made ring shaped, forming a circular hole for the constant velocity joint to be inserted. Also, the hub is cylindrical and a female spline is formed on its inside peripheral surface that matches a male spline on the outside peripheral surface of the driving wheel.

In addition, the present invention can be applied to the structure in which the inner ring member is stationary to support the sensor and the outer ring member to which the tone wheel is fitted is rotating.

The hub unit with rpm detector of this invention, constructed and used as described above, reduces the dimensions in the axial direction, and thus it can be installed in the limited space of a compact-sized automobile, simplifying the vehicle design. Moreover, in the case of the hub unit with rpm sensor of this invention, the output of the sensor is made larger, making it possible to improve the accuracy and reliability of detecting the rpm of the automobile wheel supported by the rolling bearing.

What is claimed is:

1. A bearing unit integral with an annular sensor, comprising:

a stationary outer bearing ring having an outer raceway and an axial end portion;

a rotatable inner bearing ring having an inner raceway and an axial end portion;

a plurality of rolling elements provided between the outer and inner raceways;

a sensor support member fixed to the axial end portion of the outer bearing member;

an annular sensor supported by the sensor support member and comprising a permanent magnet for generating magnetism, an annular coil for converting a change in the magnetism to electric voltage, and an annular stator for transmitting the magnetism, the annular stator made of a magnetic material and having a detecting ring portion in which a plurality of cutouts are circumferentially arranged for opening and closing the magnetism; and an annular tone wheel made of a thin magnetic plate, and fixed to the axial end portion of the inner bearing ring directly or by fitting, the tone wheel having a ring portion in which a plurality of cutouts are circumferentially arranged for opening and closing the magnetism;

wherein the detecting ring portion of the annular stator and the ring portion of the tone wheel are relatively rotatable in a mating relationship with a clearance therebetween, so that the opening and closing for magnetic flux are conducted by the relative rotation of the detecting ring portion and the ring portion, and the coil surrounded by the permanent magnet, stator, tone wheel and clearance forming a magnetic circuit, so that the magnetism change in the magnetic circuit caused by the relative rotation is converted to the electric voltage in the coil, whereby the magnetism change converted to the electric voltage is enhanced by surrounding the coil with the magnetic circuit.

\* \* \* \* \*